United States Patent
Asai et al.

(10) Patent No.: US 10,747,320 B2
(45) Date of Patent: Aug. 18, 2020

(54) TACTILE PRESENTATION DEVICE AND ELECTRONIC EQUIPMENT

(71) Applicant: Tianma Japan, Ltd., Kawasaki, Kanagawa (JP)

(72) Inventors: Takuya Asai, Kawasaki (JP); Hiroshi Haga, Kawasaki (JP)

(73) Assignee: TIANMA MICROELECTRONICS CO., LTD., Longhua District, Shenzhen (CN)

( * ) Notice: Subject to any disclaimer, the term of this patent is extended or adjusted under 35 U.S.C. 154(b) by 0 days.

(21) Appl. No.: 15/817,922

(22) Filed: Nov. 20, 2017

(65) Prior Publication Data

US 2018/0143691 A1 May 24, 2018

(30) Foreign Application Priority Data

Nov. 21, 2016 (JP) .................................. 2016-226087
Jul. 24, 2017 (JP) .................................. 2017-142935

(51) Int. Cl.
*G09G 1/00* (2006.01)
*G06F 3/01* (2006.01)
*G06F 3/041* (2006.01)
*G06F 3/044* (2006.01)

(52) U.S. Cl.
CPC .............. *G06F 3/016* (2013.01); *G06F 3/044* (2013.01); *G06F 3/0416* (2013.01); *G06F 2203/04111* (2013.01); *G06F 2203/04112* (2013.01)

(58) Field of Classification Search
CPC . G06F 3/01; G06F 3/044; G06F 3/041; G06F 3/047; G06F 3/016; G06F 3/0416
See application file for complete search history.

(56) References Cited

U.S. PATENT DOCUMENTS

| | | | |
|---|---|---|---|
| 2011/0285666 A1* | 11/2011 | Poupyrev | G06F 3/016 345/174 |
| 2011/0285667 A1 | 11/2011 | Poupyrev et al. | |
| 2014/0014960 A1* | 1/2014 | Yamazaki | G06F 3/0412 257/59 |
| 2015/0301381 A1* | 10/2015 | Okita | G02F 1/13338 349/12 |
| 2016/0357313 A1* | 12/2016 | Yang | G06F 3/044 |
| 2017/0160841 A1* | 6/2017 | Lou | G06F 3/0412 |

FOREIGN PATENT DOCUMENTS

JP 2011-248884 A 12/2011

* cited by examiner

*Primary Examiner* — Michael A Faragalla
(74) *Attorney, Agent, or Firm* — Sughrue Mion, PLLC

(57) ABSTRACT

A tactile presentation device 10 comprises: a substrate 13; a plurality of wirings 11 extending on the substrate 13; a first insulating layer 14 formed on the substrate 13 and covering the wirings 11; a plurality of electrodes 12 disposed on the first insulating layer 14; a second insulating layer 15 covering the electrodes 12; and a drive circuit selectively applying a voltage signal to the electrodes 12 through the wirings 11, based on a control signal input from the outside. Each of the wirings 11 is electrically connected to one of the electrodes 12 via a through hole opened in the first insulating layer 14. At least one of the electrodes 12 presents tactile sense to a user who touches the second insulating layer 15 over the electrode 12 while the voltage signal is being applied. Each of the wirings 11 is partly covered with at least one of the electrodes 12.

14 Claims, 31 Drawing Sheets

FIG. 5
10
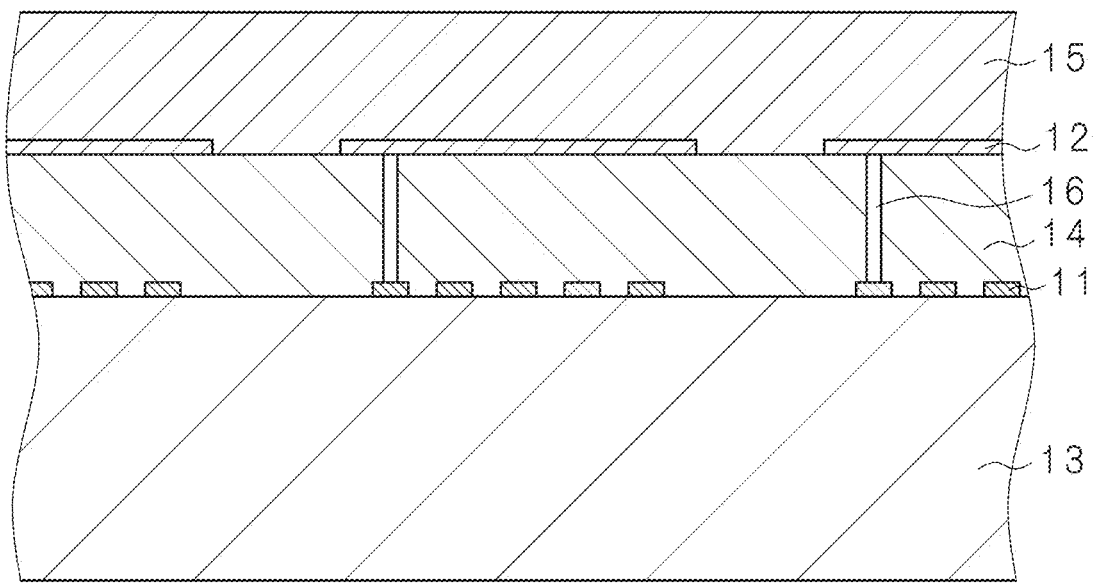
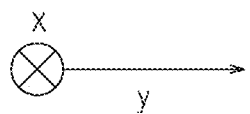

F I G. 17A
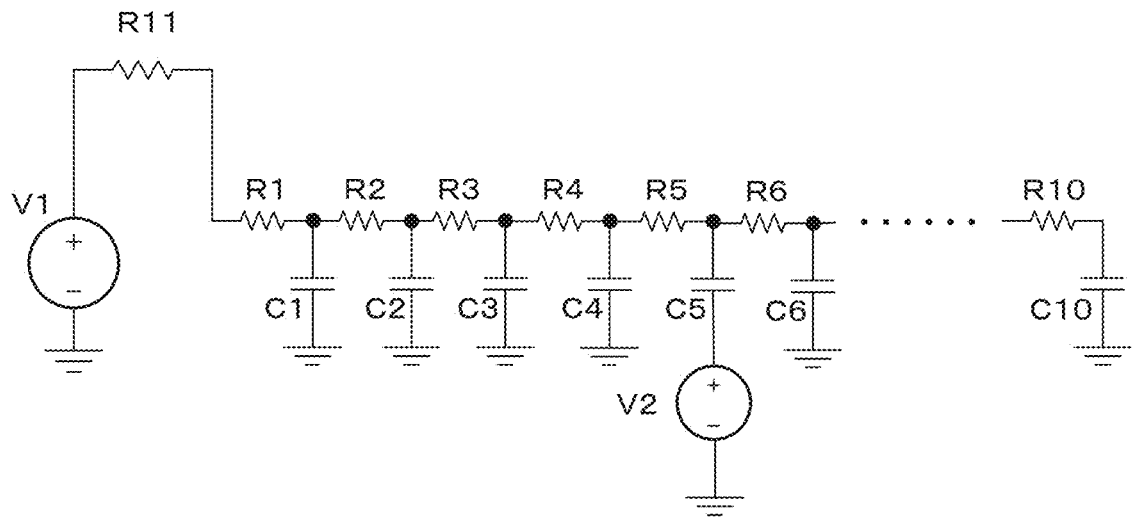
F I G. 17B
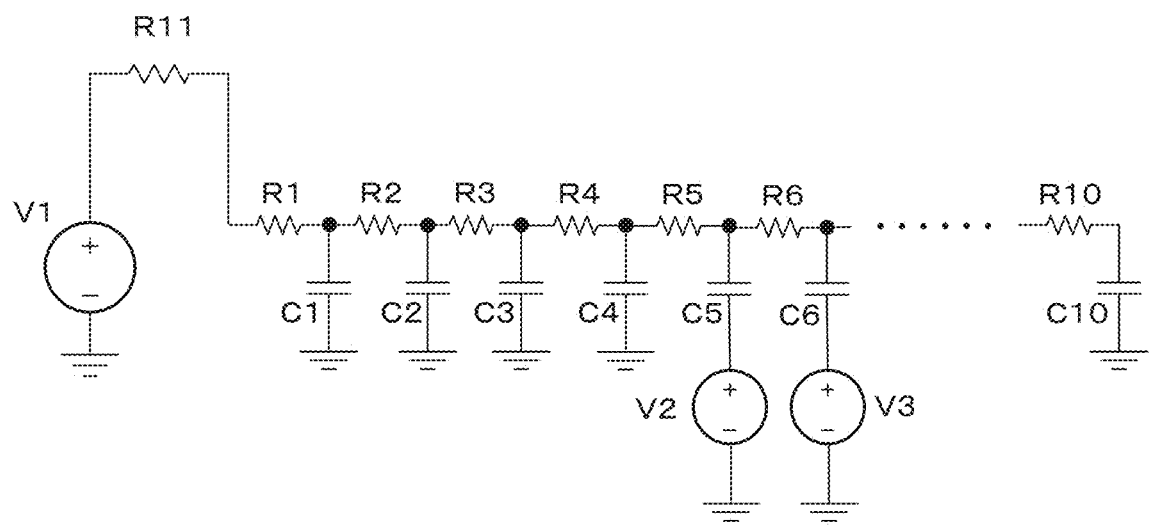

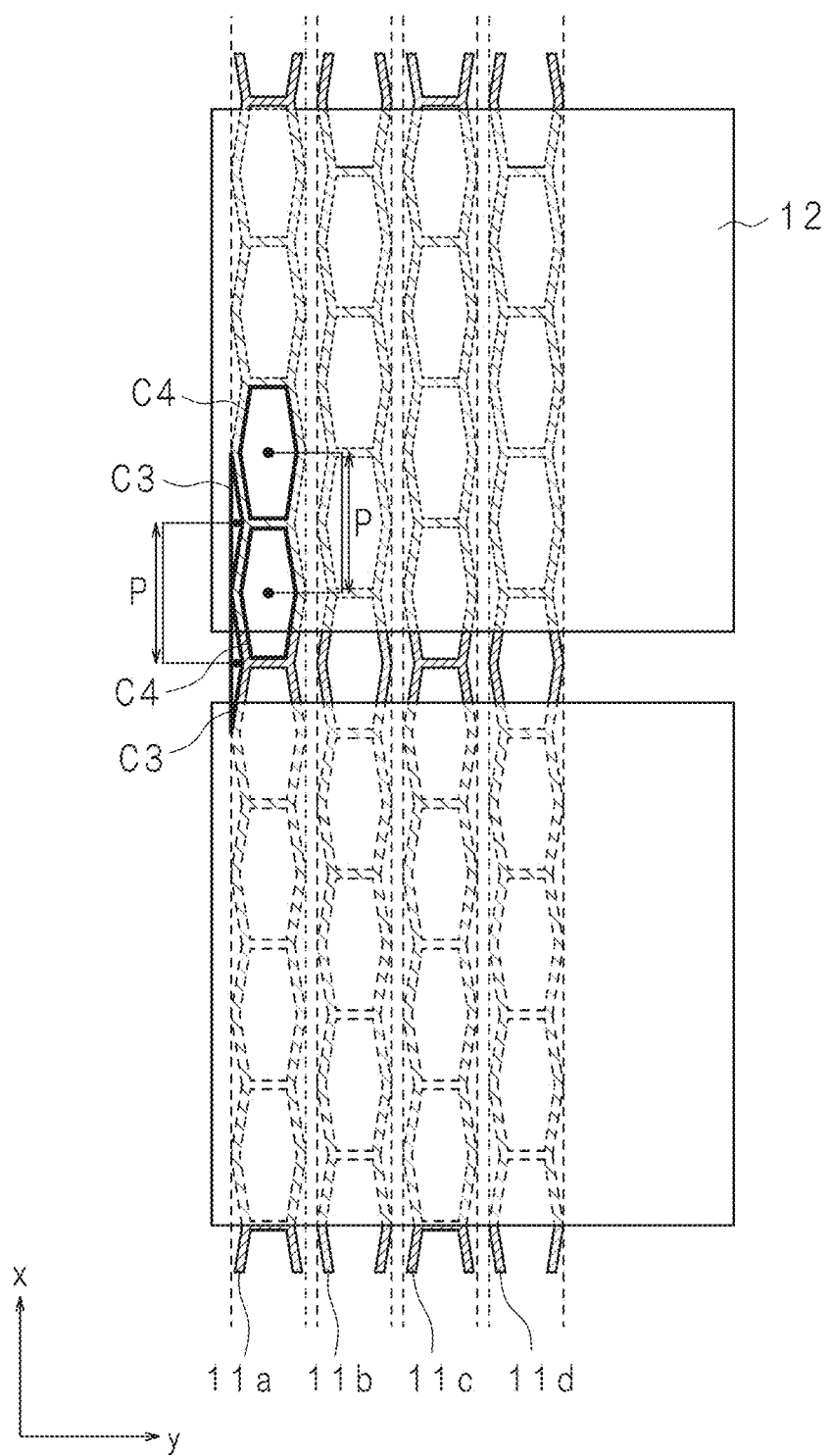

US 10,747,320 B2

TACTILE PRESENTATION DEVICE AND ELECTRONIC EQUIPMENT

CROSS-REFERENCE TO RELATED APPLICATIONS

This non-provisional application claims priority under 35 U.S.C. § 119(a) on Japanese Patent Application No. 2016-226087 filed in Japan on Nov. 21, 2016 and Japanese Patent Application No. 2017-142935 filed in Japan on Jul. 24, 2017, the entire contents of which are hereby incorporated by reference.

FIELD

The present disclosure relates to a tactile presentation device and electronic equipment.

BACKGROUND

In recent years, development of a technique for tactile presentation has been in progress, which spuriously presents tactile sense felt by a person when touching an object with a finger or the like. In the case of applying the technique of tactile presentation to electronic equipment concerning a liquid crystal display or an organic light emitting diode (OLED) display for example, a tactile presentation device of a panel type for presenting tactile sense is provided on the display. According to an image displayed on the display, the tactile presentation device reproduces tactile sense of an object in the image and causes a user who touches the panel to perceive a sense of touch.

A method of presenting tactile sense employs, for example, an actuator type, an electric stimulus type, an electric vibration type or the like. Among them, the electric vibration type utilizes electrostatic force to present tactile sense on the user's skin.

The tactile presentation device of the electric vibration type comprises an electrode for tactile presentation covered with an insulating film, and applies a voltage signal for tactile presentation to the electrode. Here, the voltage signal for tactile presentation is a voltage signal with frequency at which the mechanoreceptor of human skin has sensitivity. When the user touches the insulating film, electrostatic force is generated between the finger skin and the electrode. If the user slides his/her finger on the surface of the insulating film, variation in the frictional force occurs at the frequency of the voltage signal for tactile presentation, allowing the user to perceive a so-called feel of texture.

The tactile presentation device of the electric vibration type may include multiple electrodes disposed on a substrate, each of which is independently driven so as to partially present tactile sense. For example, Japanese Patent Application Laid-Open Publication No. 2011-248884 discloses a tactile presentation device that partially presents tactile sense by independently driving multiple electrodes for tactile presentation with a driver.

In the tactile presentation device of the electric vibration type, however, some wiring configurations for applying voltage to the electrodes may cause the user to perceive tactile sense which is not necessary. FIG. 1 is a partial enlarged view illustrating a configuration example of a tactile presentation device 110 according to the related art. FIG. 1 illustrates a partial enlarged view in which a part of a panel for tactile presentation is enlarged. As illustrated in FIG. 1, the tactile presentation device 110 according to the related art comprises wirings 111, electrodes 112 and a substrate 113. Multiple electrodes 112 are arrayed in matrix on the substrate 113, while wirings 111 are connected to the respective electrodes 112. The electrodes 112 and wirings 111 are covered with an insulating film which forms a touch surface to be touched by the user.

The electrodes 112 are connected to an external signal voltage source (not illustrated) through the wirings 111. In the case where a voltage signal for tactile presentation is applied from a signal voltage source to one of the electrodes 112 through the corresponding wiring 111, the electrode 112 is electrically charged to present tactile sense to a finger of the user. The tactile presentation device 110 may independently drive each of the electrodes 112, so as to partially present tactile sense.

An example case is discussed where a voltage signal is applied to an electrode 112a through a wiring 111a indicated by a thick line in FIG. 1 to present tactile sense at the electrode 112a. If a finger of the user touches the surface of the insulating film over the electrode 112a, electrostatic coupling occurs between the electrode 112a and the finger skin through the insulating film. The electrostatic force generated between the electrode 112a and the finger skin varies according to the frequency of the voltage signal, causing vibration to the finger. If, on the other hand, the finger touches a part of the surface of the insulating film other than the electrode 112a, no vibration is supposed to occur because no voltage is applied to the other electrodes 112.

However, since voltage is applied to the electrode 112a through the wiring 111a, unnecessary tactile sense may be developed also on the wiring 111a. FIG. 2 illustrates the development of unnecessary tactile sense according to the related art. As illustrated in FIG. 2, in the case where the finger touches the surface of the insulating film in the vicinity of the wiring 111a, a leakage electric field from the wiring 111a may generate electrostatic coupling between the wiring 111a and the finger skin. That is, tactile sense may be perceived at a portion where the tactile sense is not supposed to be perceived. In the description below, the tactile sense which is not necessary as described above is referred to as "unwanted tactile sense."

SUMMARY

A tactile presentation device according to an aspect of the present disclosure comprises: a substrate; a plurality of wirings extending on the substrate; a first insulating layer formed on the substrate and covering the wirings; a plurality of electrodes disposed on the first insulating layer; a second insulating layer covering the electrodes; and a drive circuit selectively applying a voltage signal to the electrodes through the wirings, based on a control signal input from the outside. Each one of the wirings is electrically connected to one of the electrodes via a through hole opened in the first insulating layer. At least one of the electrodes presents tactile sense to a user who touches the second insulating layer over the electrode in a state where the voltage signal is being applied. Each of the wirings is partially covered with at least one of the electrodes.

A tactile presentation device, comprising: a plurality of electrodes aligned along a first direction above a substrate and held between a first insulating layer formed on the substrate and a second insulating layer formed over the first insulating layer; a plurality of wirings formed between the substrate and the first insulating layer, extending along the first direction under at least one of the electrodes, and arranged within a forming width of the electrodes in a second direction intersecting the first direction, each of the wirings being electrically connected to one of the plurality of electrodes via a through hole opened in the first insulating layer; and a drive circuit connecting a part of the plurality of electrodes to a signal voltage source generating a voltage signal while connecting another part of the plurality of electrodes to a reference potential, based on a control signal input from an outside.

Electronic equipment according to an aspect of the present disclosure comprises: a touch panel display device that displays a result of processing performed by a processor included therein and accepts an operation input corresponding to the result of processing; and the tactile presentation device according to any one of those described above that presents tactile sense in accordance with the display of the result of processing.

It is to be understood that both the foregoing general description and the following detailed description are exemplary and explanatory and are not restrictive of this disclosure.

BRIEF DESCRIPTION OF THE DRAWINGS

FIG. 5 is a partial section view illustrating a configuration example of a tactile presentation device;

FIGS. 17A and 17B are circuit diagrams in the case of presenting tactile sense in multiple portions;

FIGS. 27A and 27B illustrate another example of Embodiment 4;

DETAILED DESCRIPTION

The present invention will be described below in detail with reference to the drawings illustrating the embodiments thereof.

Embodiment 1

Figure 1:
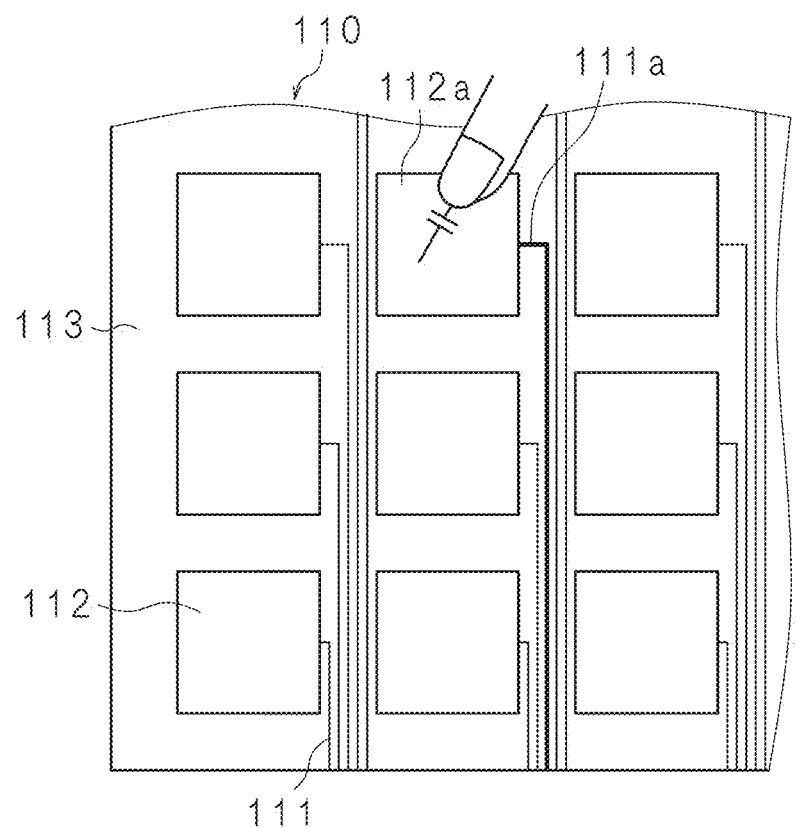
FIG. 1 is a partial enlarged view illustrating a configuration example of a tactile presentation device according to the related art.
Figure 2:
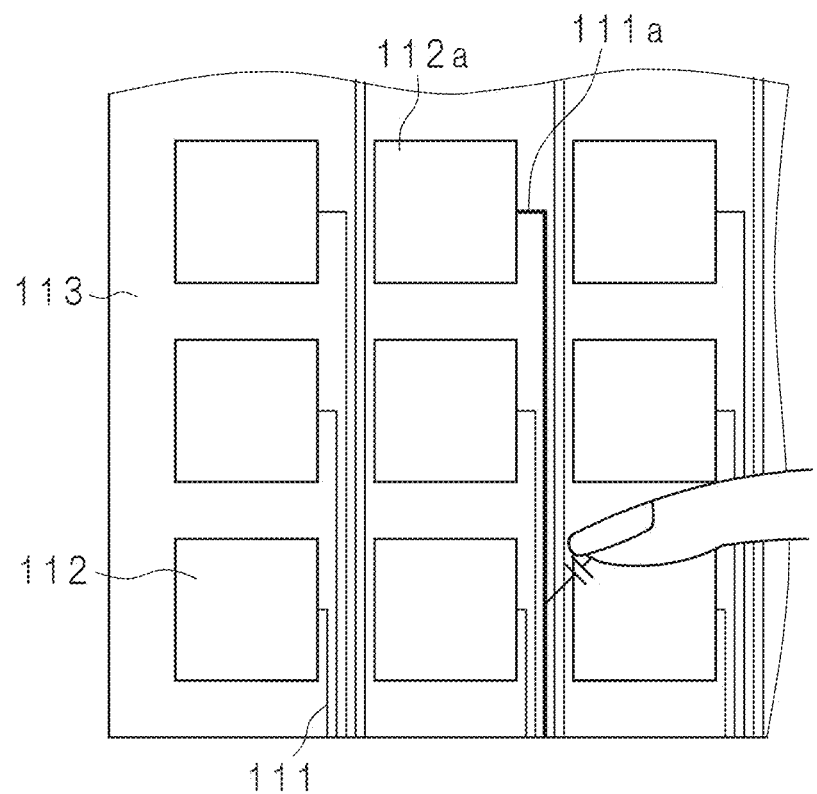
FIG. 2 illustrates the development of unwanted tactile sense according to the related art.
Figure 3:
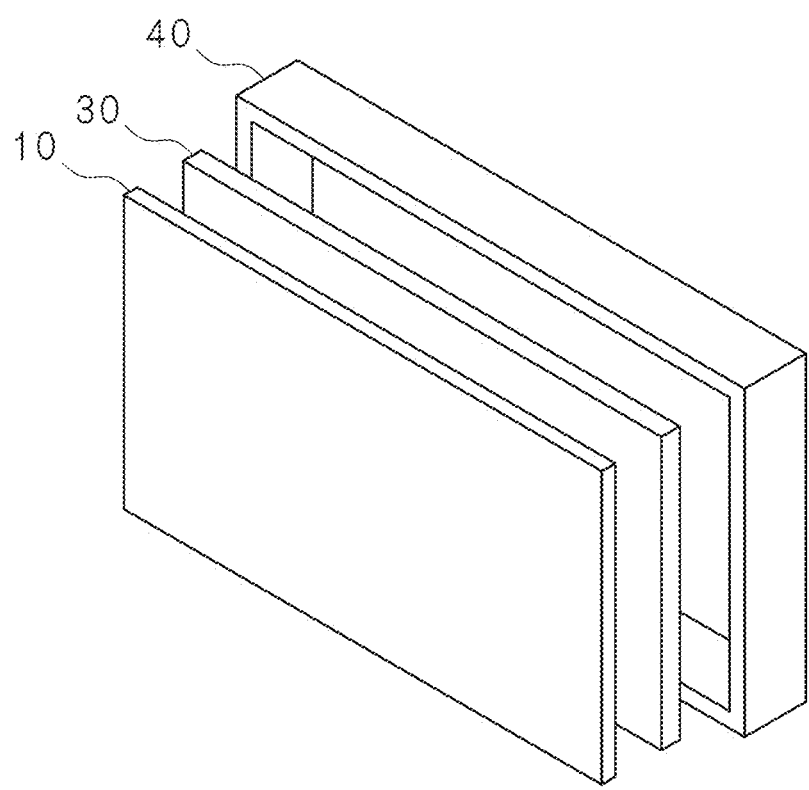
FIG. 3 is an exploded view illustrating a configuration example of electronic equipment.

FIG. 3 is an exploded view illustrating a configuration example of electronic equipment 1. In the present embodiment, description is made by taking the electronic equipment 1 that displays an image, such as a smartphone, tablet terminal or notebook personal computer, as an example of electronic equipment mounted with a tactile presentation device 10. The electronic equipment 1 includes a display device 30 and the tactile presentation device 10.

The display device 30 is an image display device concerning, for example, a liquid crystal display, an OLED display or the like. For example, the display device 30 is a touch panel display device having a rectangular display surface, which accepts an operation input by touching operation for the display surface. In the description below, the display surface side of the display device 30 is assumed as the front side of the electronic equipment 1, whereas the side opposite to the display surface is assumed as the back side thereof. More specifically, the display device 30 comprises a display panel (not illustrated) on which an image is displayed and a touch panel (not illustrated) opposed to the display panel. The display device 30 obtains the processing result concerning image processing from the processor integrated in the electronic equipment 1, and displays the processing result on the display panel. Moreover, the display device 30 accepts an operation input according to the processing result by a touch panel. The electronic equipment 1 may be configured not to include a processor therein but to display the processing result obtained from an external device, as in the case where the electronic equipment 1 is, for example, a display device connected to an external device of a desktop personal computer or the like. The display device 30 is accommodated in a casing 40 having the shape of a box.

The tactile presentation device 10 is disposed on the front side of the display device 30 so as to be opposed to the display surface of the display device 30. The tactile presentation device 10 is accommodated in the casing 40 together with the display device 30. The tactile presentation device 10 obtains the processing result from the processor integrated in the electronic equipment 1, and presents tactile sense in accordance with the processing result displayed on the display device 30. More specifically, for example, the tactile presentation device 10 presents the tactile sense of an object to be operated that is displayed on the display panel at a corresponding position on the touch panel where the object is displayed.

Figure 4:
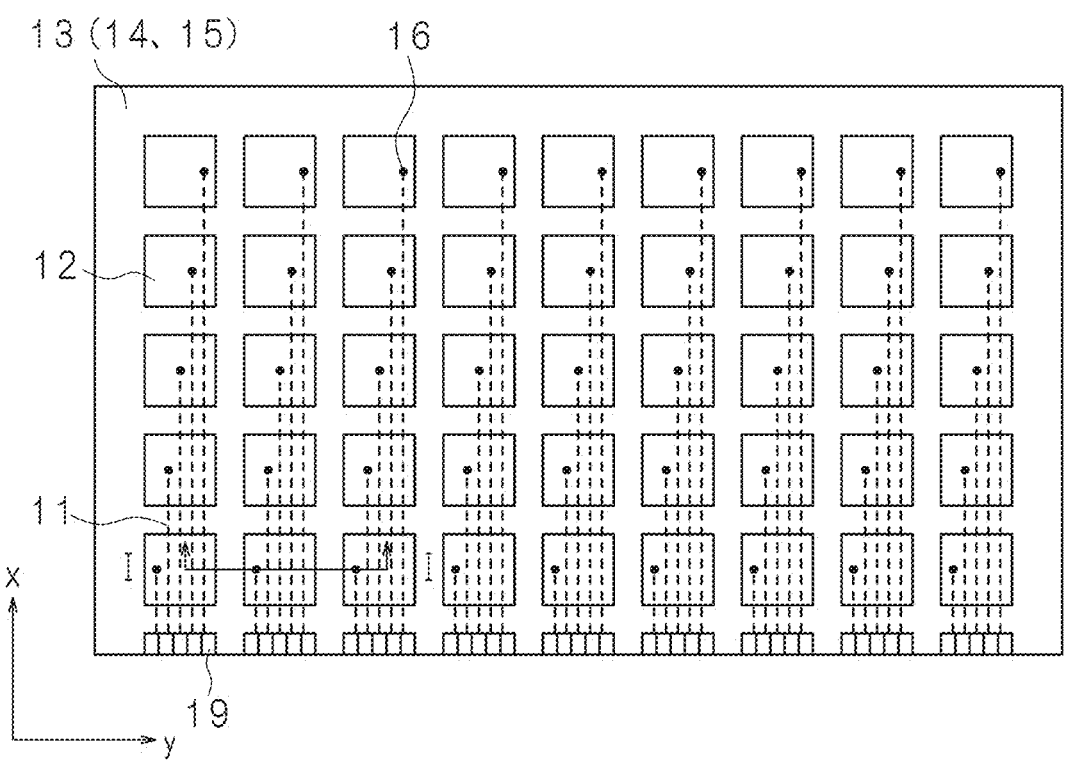
FIG. 4 is a front view illustrating a configuration example of a tactile presentation device.

FIG. 4 is a front view illustrating a configuration example of the tactile presentation device 10. FIG. 5 is a partial section view illustrating a configuration example of the tactile presentation device 10. FIG. 5 illustrates a partial section view of the cross section of the tactile presentation device 10 along the line I-I in FIG. 4. The tactile presentation device 10 comprises a substrate 13, multiple electrodes 12 disposed over the substrate 13, and multiple wirings 11 connected to the respective electrodes 12.

The substrate 13 is a transparent substrate for placing the electrodes 12 and the like thereon, which is a glass substrate, for example. While the substrate 13 has a rectangular shape for example, the shape is not limited thereto but may also be circular, elliptical or polygonal, for example, to accommodate the display surface of the display device 30.

Each of the electrodes 12 is a flat-plate electrode for presenting tactile sense to the user, and made of conductive material which is transmissive to visible light, such as indium tin oxide (ITO), for example. While each of the electrodes 12 is illustrated as rectangular in FIG. 4, the shape of the electrode 12 is not limited thereto but may also be circular, elliptical or polygonal, for example. Moreover, the number of electrodes 12 illustrated in FIG. 4 is a mere example, and is not limited to the illustrated number. The electrodes 12 are arrayed in matrix along a first direction x and a second direction y intersecting the first direction x. As illustrated in FIG. 4, for example, the electrodes 12 are arrayed while the short-side direction of the substrate 13 is assumed as the first direction x and the long-side direction of the substrate 13 is assumed as the second direction y. It is not necessary for the directions of the sides of the substrate 13 to correspond to the array directions of the electrodes 12. Furthermore, though the electrodes 12 are assumed to be arrayed in matrix as described above, the array pattern of the electrodes 12 is not limited to matrix.

The wirings 11 are for connecting the respective electrodes 12 to a drive circuit 22 which will be described later (see FIG. 7), and are made of, for example, silver, aluminum or molybdenum. It is noted that each of the wirings 11 may be a transparent member or an opaque member. All wirings 11 extend along one direction on the substrate 13. More specifically, the wirings 11 all extend along one array direction of the electrodes 12 arrayed in matrix. For example, as illustrated in FIG. 4, all the wirings 11 extend along the first direction x. The wirings 11 have one-to-one correspondence with the electrodes 12 in which one of the wirings 11 is connected to one of the electrodes 12, and one end of the wiring 11 is connected to any one of the multiple electrodes 12 arrayed on the substrate 13. The other end of the wiring 11 is connected to an input terminal 19 located on a long side of the substrate 13, and is connected to the drive circuit 22 through the input terminal 19. The wiring 11 supplies a voltage signal output from the drive circuit 22 to the electrode 12. Detailed arrangement of the electrodes 12 and wirings 11 will specifically be described later.

As illustrated in FIG. 5, the tactile presentation device 10 includes, in addition to the wirings 11, the electrodes 12 and the substrate 13 described above, a first insulating layer 14, a second insulating layer 15 and so forth. The first insulating layer 14 is an insulating layer with the thickness of several μm formed on the substrate 13. As described above, multiple wirings 11 are disposed on the substrate 13. The first insulating layer 14 is formed on the substrate 13 so as to cover the wirings 11. The electrodes 12 described above are formed on the first insulating layer 14. Accordingly, the first insulating layer 14 insulates the wirings 11 from the electrodes 12 as well as from each other.

As described above, the wirings 11 and the electrodes 12 have one-to-one correspondence. Each individual wiring 11 is electrically connected to one of the electrodes 12 via a through hole opened in the first insulating layer 14. More specifically, in the first insulating layer 14, a contact hole 16 which is a through hole is formed from one end of the wiring 11 to the back surface of the corresponding electrode 12. The wiring 11 and the electrode 12 are electrically connected to each other in one-to-one correspondence through the contact hole 16. While one contact hole 16 serves to connect one electrode 12 and the wiring 11 in the present embodiment, multiple contact holes 16 may also be employed. This can reduce the contact resistance at the portions of contact.

The second insulating layer 15 is an insulating layer covering the multiple electrodes 12. The second insulating layer 15 is formed with the thickness of several μm, for example, over the first insulating layer 14. More specifically, the second insulating layer 15 is layered on the front face of the first insulating layer 14 in the form of holding the electrodes 12 between itself and the first insulating layer 14, to form a touch surface concerning the tactile presentation device 10. If a user's finger touches the surface of the second insulating layer 15, the second insulating layer 15 insulates the user's finger from the electrodes 12, preventing the user's finger from direct electrical conduction.

Figure 6:
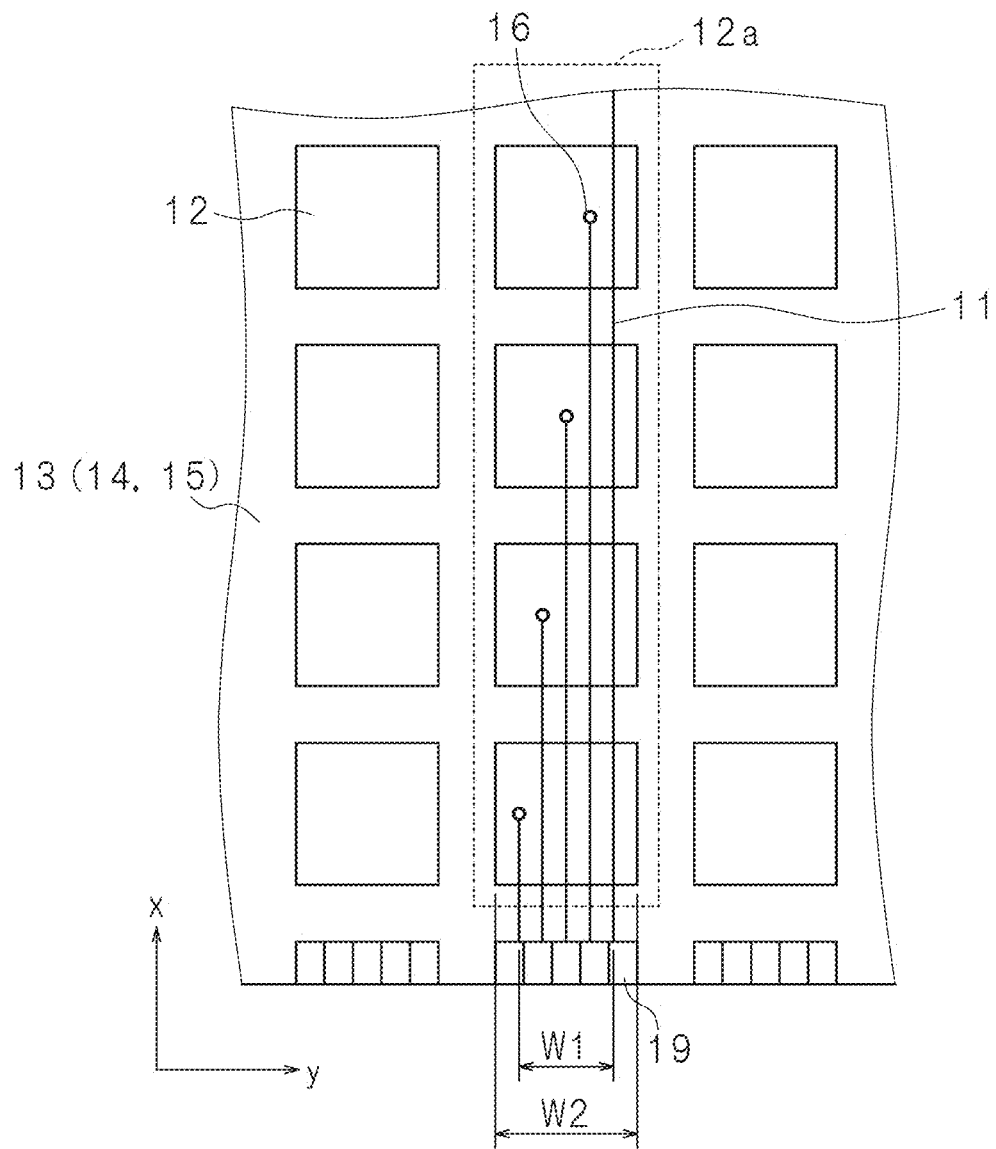
FIG. 6 illustrates the positional relationship of wirings and electrodes.

FIG. 6 illustrates the positional relationship of the wirings 11 and electrodes 12. Unlike FIG. 4, the contact holes 16 are indicated as white circles in FIG. 6. With reference to FIGS. 5 and 6, details related to the arrangement of the wirings 11 and electrodes 12 will be described. The wiring 11 supplying voltage to the first electrode 12 disposed at the position closest to the input terminal 19 side (bottom side in FIG. 6) is so disposed as to extend to the portion under the first electrode 12. Next, the wiring 11 supplying voltage to the second electrode 12 from the input terminal 19 is so disposed as to pass under the first electrode 12 and to extend to the portion under the second electrode 12. Likewise, the wiring 11 supplying voltage to the third electrode 12 is so disposed as to pass under the first and second electrodes 12 and to extend to the portion under the third electrode 12. The wiring 11 supplying voltage to the fourth electrode 12 is so disposed as to pass under the first to third electrodes 12 and to extend to the portion under the fourth electrode 12. Accordingly, each of the wirings 11 is covered with at least one electrode 12.

Here, an electrode group 12a is discussed, which is enclosed by the broken line in FIG. 6 where electrodes 12 are aligned in the first direction x. The wirings 11 supplying the voltage to the respective electrodes 12 concerning the electrode group 12a are all arranged to be included in the width of the electrode 12 in the second direction y intersecting the first direction x. More specifically, the wirings 11 are so arrayed in the second direction y that the distance between two wirings 11 and 11 at both ends is shorter than the width at which the electrode 12 is formed. For example, if the electrode 12 is a rectangular flat plate electrode having both sides parallel to the first direction x and the second direction y as illustrated in FIG. 6, a distance W1 between the wirings 11 and 11 located at both ends is made shorter than a width W2 of one side of the electrode 12 which is parallel to the second direction y. This allows all the wirings 11 to be included within the width (width in the second direction y) at which the electrode 12 is formed.

As described above, the wirings 11 extend along the first direction x to a portion under at least one of the electrodes 12. Thus, as the electrode group 12a has a structure in which the electrodes 12 are aligned in the first direction x, the wirings 11 extend only to the portion under the electrodes 12 concerning the electrode group 12a, not to any portion under the electrodes 12 other than those in the electrode group 12a. Accordingly, as illustrated in FIG. 6, none of the wirings 11 concerning the electrode group 12a is located in a region on the substrate 13 between adjacent electrodes 12 and 12 in the second direction y, and the wirings 11 are not covered with the electrodes 12 only in a region between adjacent electrodes 12 and 12 in the extending direction (first direction x). That is, in the front view, the electrodes 12 are configured to cover the wirings 11 to the maximum.

Figure 7:
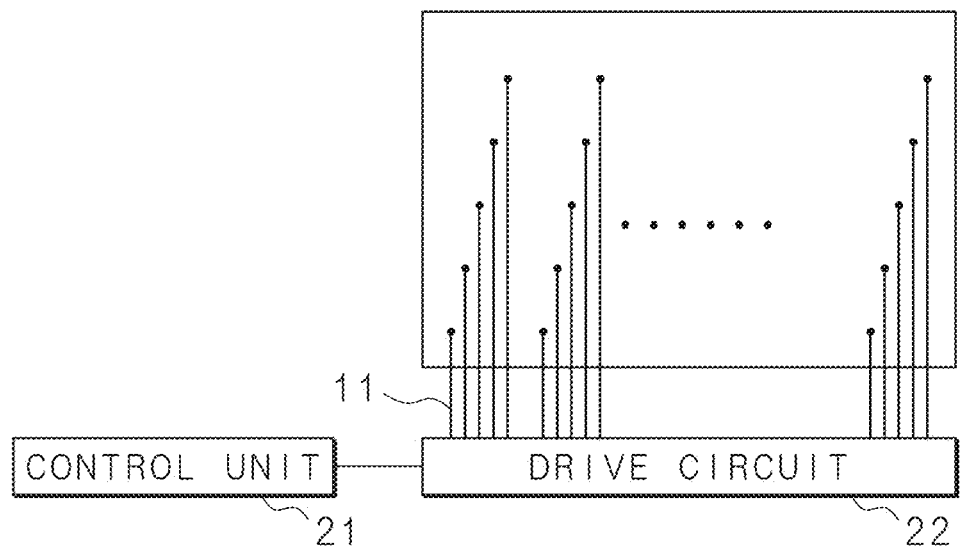
FIG. 7 is a schematic view illustrating a configuration example of a tactile presentation device.

FIG. 7 is a schematic view illustrating a configuration example of a tactile presentation device 10. The tactile presentation device 10 comprises a control unit 21 and a drive circuit 22 in addition to the wirings 11 and the like described above. The control unit 21 including, for example, a central processing unit (CPU) and a microprocessing unit (MPU) controls the operation of the tactile presentation device 10 in accordance with the image processing result obtained by the processor integrated in the electronic equipment 1, generates a control signal designating the electrode 12 for presenting tactile sense, and outputs the control signal to the drive circuit 22. The drive circuit 22 is a circuit to which the individual wirings 11 are connected, and applies voltage to each electrode 12 based on the control signal output from the control unit 21.

Figure 8:
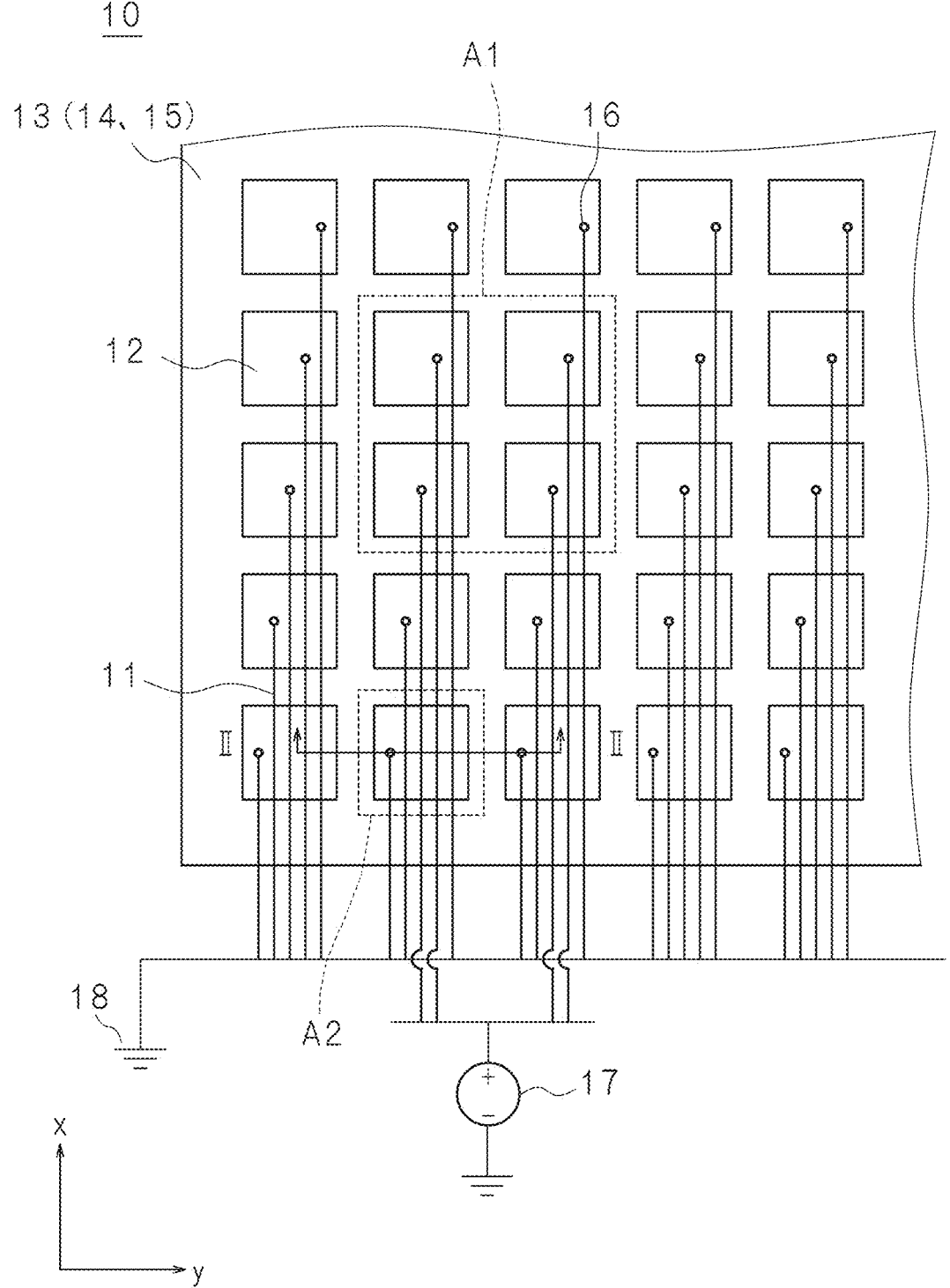
FIG. 8 illustrates a configuration example of wirings.

FIG. 8 illustrates partial presentation of tactile sense. An example case is discussed where the tactile sense is presented in a region A1 illustrated in FIG. 8. Here, the control unit 21 controls the drive circuit 22 to apply a voltage signal to the electrodes 12 located in the region A1. More specifically, the control unit 21 connects one end of each of the wirings 11, the other end of which is connected to one of the electrodes 12 located in the region A1, to a signal voltage source 17 through a switching element (not illustrated). The signal voltage source 17 is a pulse voltage source for example, which supplies pulse voltage to the electrodes 12 through the wirings 11. Thus, the pulse voltage is applied to the electrodes 12 located in the region A1. It is noted that the signal voltage source 17 may be an alternating voltage source. While the voltage signal is being applied, the electrodes 12 present tactile sense to a user's finger that touches the second insulating layer 15 over the electrodes 12 of interest. More specifically, as described earlier, a voltage signal is applied to charge the electrodes 12, which generates electrostatic force between the electrodes 12 and the user's finger. In the case where the user slides a finger, a change in frictional force occurs at the frequency of the voltage signal, allowing the user to perceive the feel of texture.

Moreover, the drive circuit 22 connects the electrodes 12 other than the electrodes 12 to which the voltage signal is applied, to a reference potential 18 different from the signal voltage source 17. More specifically, in accordance with a control signal from the control unit 21, the drive circuit 22 connects one end of each of the wirings 11, the other end of which is connected to an electrode 12 in a region other than the region A1, to the reference potential 18 through the switching element described above. The reference potential 18 is, for example, a ground (GND). It is to be noted that the reference potential 18 may also be a direct voltage source. The drive circuit 22 connects the electrodes 12 other than the electrodes 12 to which the voltage signal is applied, i.e. the electrodes 12 not presenting tactile sense, to GND, so as to ground the other electrodes 12. As described above, the drive circuit 22 selectively applies voltage signals to the multiple electrodes 12 based on the control signal from the control unit 21.

Figure 9:
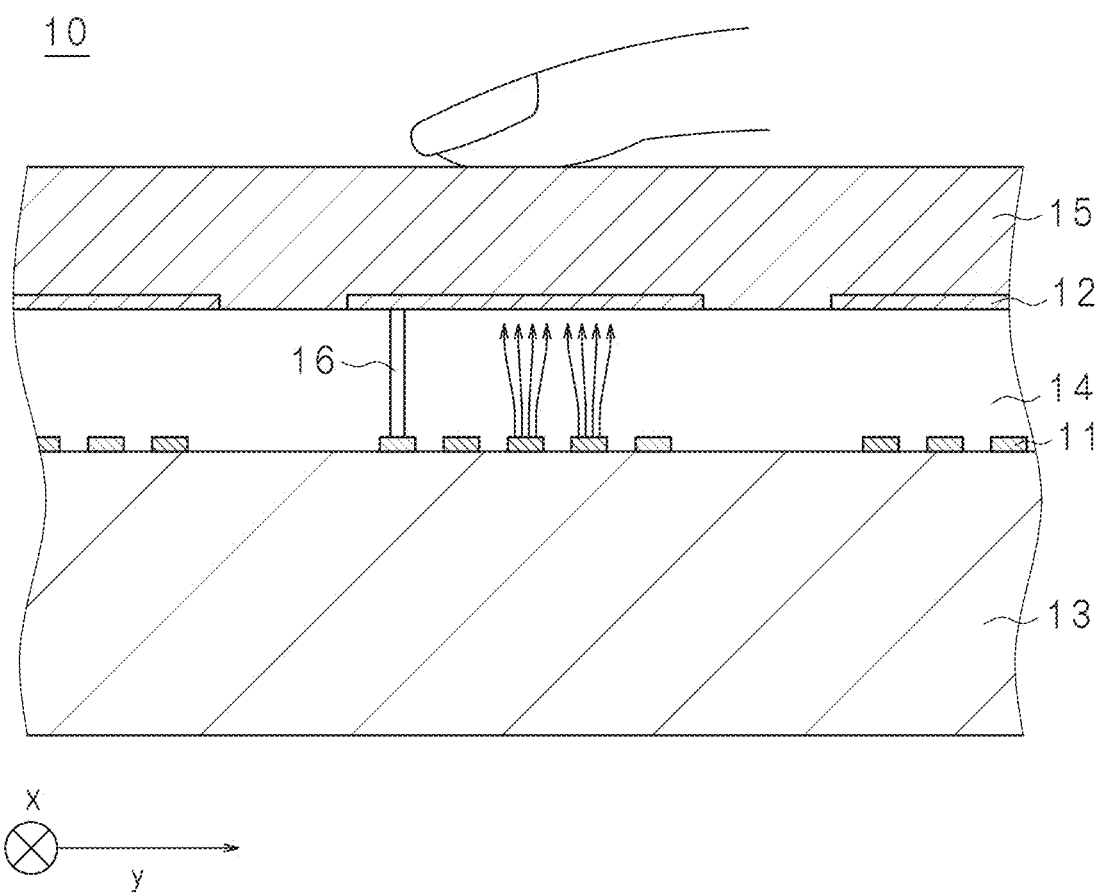
FIG. 9 illustrates a shield effect of an electrode.

Here, the electrode 12 not presenting tactile sense that is located in a region A2 in FIG. 8 is discussed. FIG. 9 illustrates the shield effect of the electrode 12. FIG. 9 illustrates a partial section view of the cross section of the tactile presentation device 10 along the line II-II in FIG. 8. For the convenience of illustration, no hatching is added to the first insulating layer 14 in FIG. 9. Since the electrode 12 illustrated at the middle in FIG. 9 is not connected to the signal voltage source 17, no voltage signal for tactile presentation is applied. Thus, in the case where the user touches the surface of the second insulating layer 15 over the electrode 12 of interest, no tactile sense due to the electrostatic coupling between the user's finger and the electrode 12 is presented.

Meanwhile, a leakage electric field (illustrated by the arrows in FIG. 9) may be generated from the wirings 11 connected to the electrodes 12 located in the region A1, i.e. from the wirings 11 connected to the signal voltage source 17, possibly causing electrostatic coupling between the user's finger and the wirings 11. In the region A2 where no tactile sense is presented, however, the wirings 11 connected to the signal voltage source 17 are located under the electrode 12 connected to the reference voltage source 18. Thus, the leakage electric field from the wirings 11 is shielded by the electrode 12, which reduces the possibility of leaking out to the second insulating layer 15. Thus, the electrode 12 illustrates a shield effect. Accordingly, the possibility of providing the user with unwanted tactile sense may be reduced.

According to Embodiment 1, therefore, the development of unwanted tactile sense may be reduced.

Moreover, according to Embodiment 1, the multiple wirings 11 extend in the same first direction x, which can facilitate the circuit design for the tactile presentation device 10.

Figure 10:
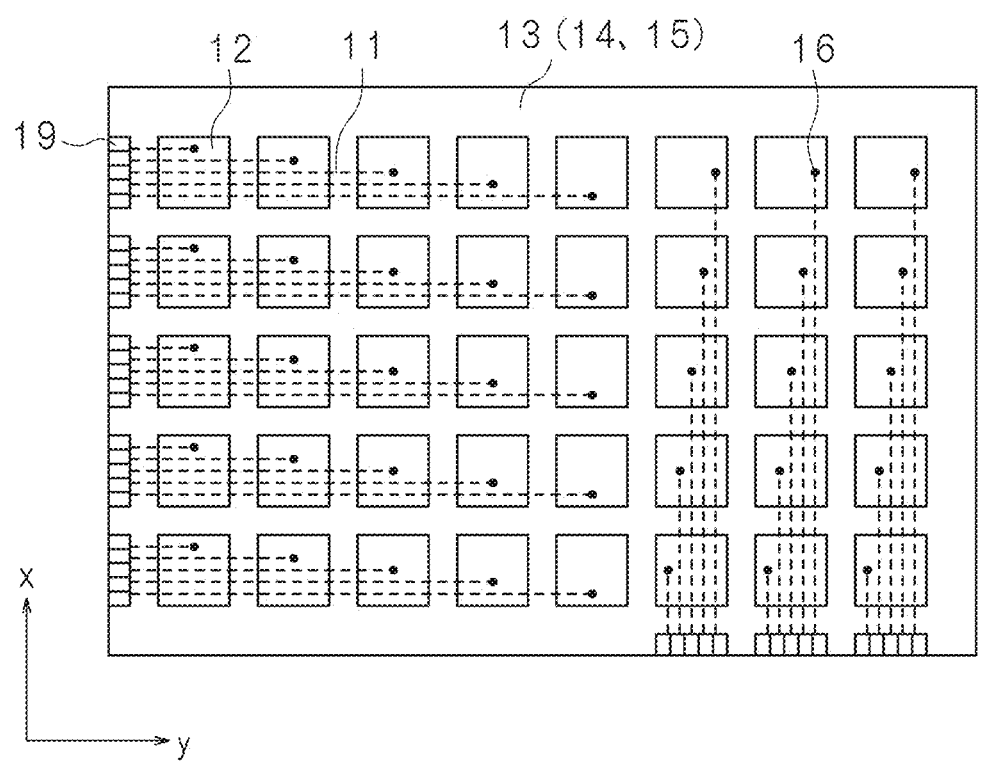
FIG. 10 is a front view illustrating another example of wiring configuration in a tactile presentation device.

While the multiple wirings 11 extend in the first direction x in the description above, it is unnecessary for all the wirings 11 to extend in the same direction. FIG. 10 is a front view illustrating another example of wiring configuration in the tactile presentation device 10. For example, as illustrated in FIG. 10, some wirings 11 may extend in the first direction x while the other wirings 11 may extend in the second direction y. That is, as long as the wirings 11 are located under at least one electrode 12, the extending direction of the wirings 11 is not particularly limited.

Variation Example 1

Figure 11:
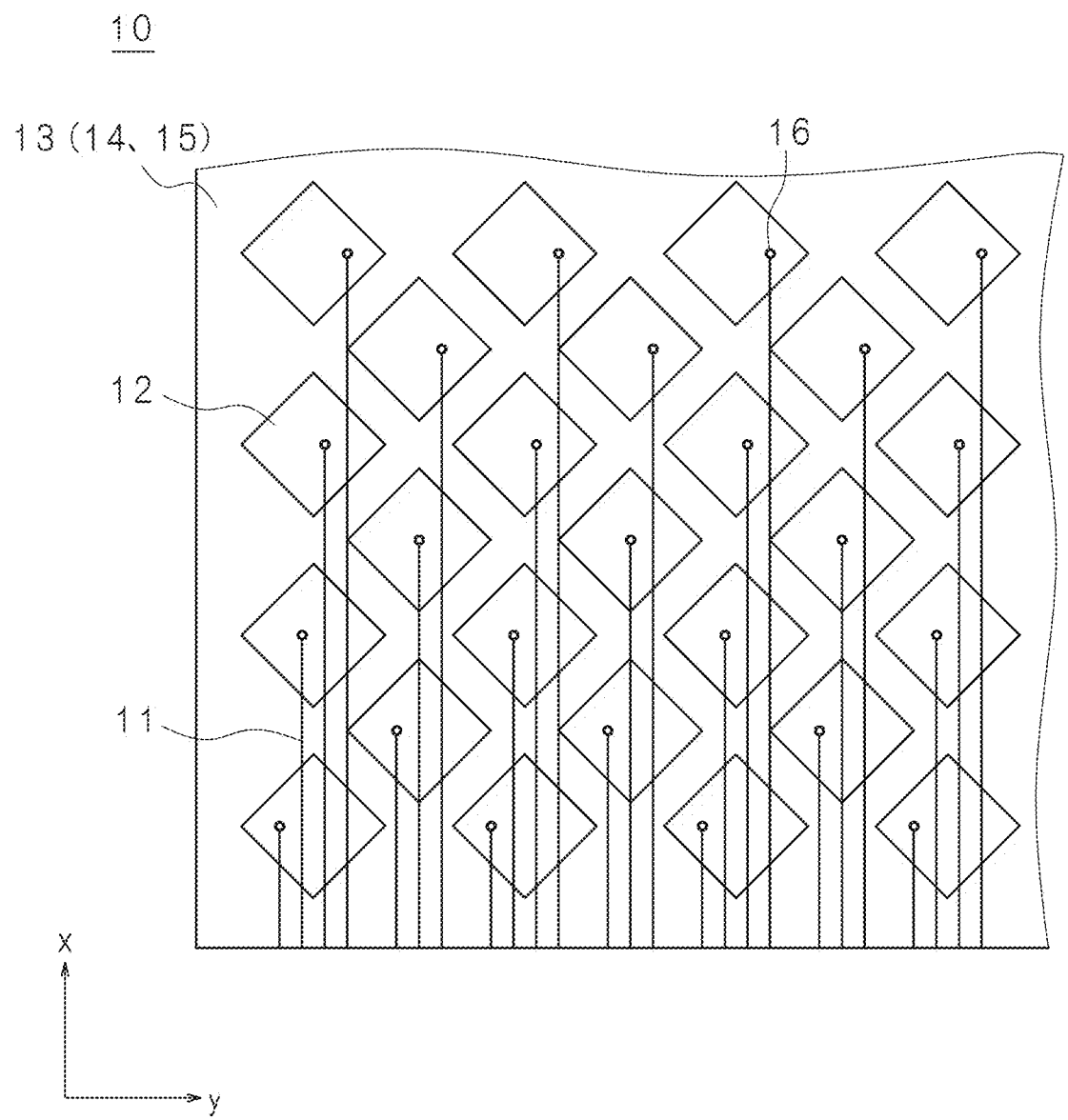
FIG. 11 is a front view illustrating a configuration example of a tactile presentation device.

Embodiment 1 described a form where the multiple electrodes 12 are arrayed in matrix along the first direction x and the second direction y. It is, however, not always necessary for the electrodes 12 to be arrayed in matrix. FIG. 11 is a front view illustrating a configuration example of a tactile presentation device 10 according to Variation Example 1. In the tactile presentation device 10 according to Variation Example 1, multiple electrodes 12 are arrayed in a mesh pattern. More specifically, the electrodes 12 are arrayed with regularity on the substrate 13, each of which has an identical diamond shape in the front view. For example, each of the diamond-shaped electrodes 12 is so disposed that its two diagonal lines are parallel to the first direction x and the second direction y (short side direction and long side direction of the substrate 13), respectively.

Accordingly, the multiple electrodes 12 are arrayed in a mesh pattern as a whole. While each electrode 12 is illustrated to have a square shape in FIG. 11, it may also have a diamond shape with obtuse angles and acute angles.

All the wirings 11 extend in parallel to the diagonal lines of the diamond-shaped electrodes 12, 12, . . . . More specifically, as illustrated in FIG. 11, each wiring 11 extends to a portion under at least one electrode 12 along the first direction x which is parallel to one diagonal line of the electrode 12. Even with the configuration described above, the wirings 11 are covered with the electrodes 12, so that the development of unwanted tactile sense may be reduced.

While it was described above that the electrodes 12 having a diamond shape are arrayed in a mesh pattern, the electrodes 12 having, for example, a circular, elliptical, triangle or hexagonal shape may also be arrayed in a mesh pattern.

As described above, according to Variation Example 1, even with the configuration where the electrodes 12, 12, 12 . . . are arrayed in a mesh pattern, the development of unwanted tactile sense may also be reduced as in Embodiment 1.

Embodiment 2

In the present embodiment, a form is described where all the wirings 11 have the same length. Parts overlapping those in Embodiment 1 will be denoted by the same reference numerals in the drawings and will not be described here.

Figure 12:
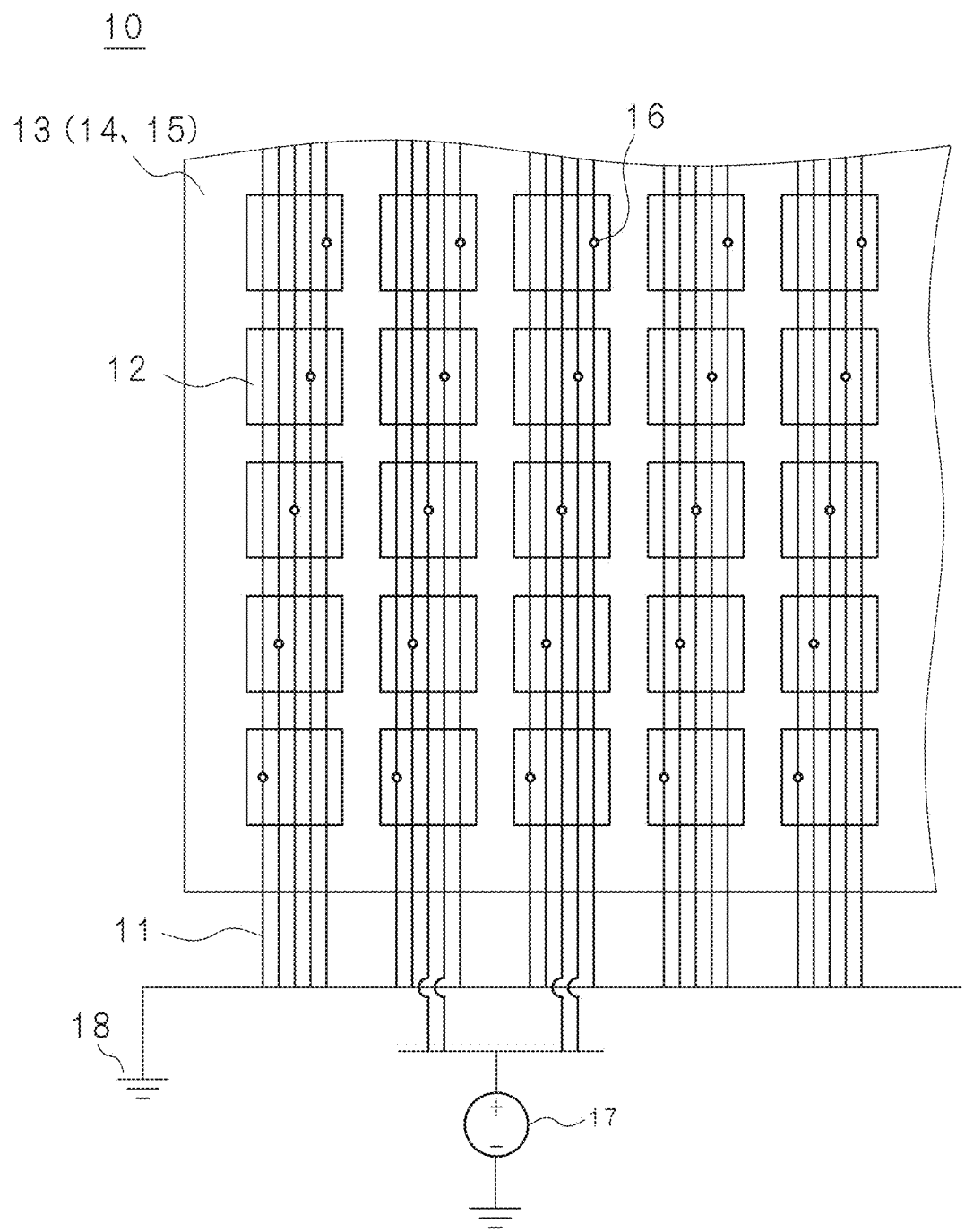
FIG. 12 illustrates a configuration example of wirings.

FIG. 12 illustrates a configuration example of wirings 11. As in Embodiment 1, all the wirings 11 extend along the first direction x. Meanwhile, the wirings 11 according to the present embodiment all extend along the first direction x while having the same length.

In the present embodiment, all the wirings 11 are disposed to pass under all the electrodes 12 aligned in the first direction x. As illustrated in FIG. 12, for example, the wiring 11 connected to the first electrode 12 are so disposed as to extend under all the first, second, third, . . . electrodes 12 aligned in the first direction x. As all the wirings 11 have the same length, the wirings 11 have the same magnitude of internal resistance.

Figure 13:
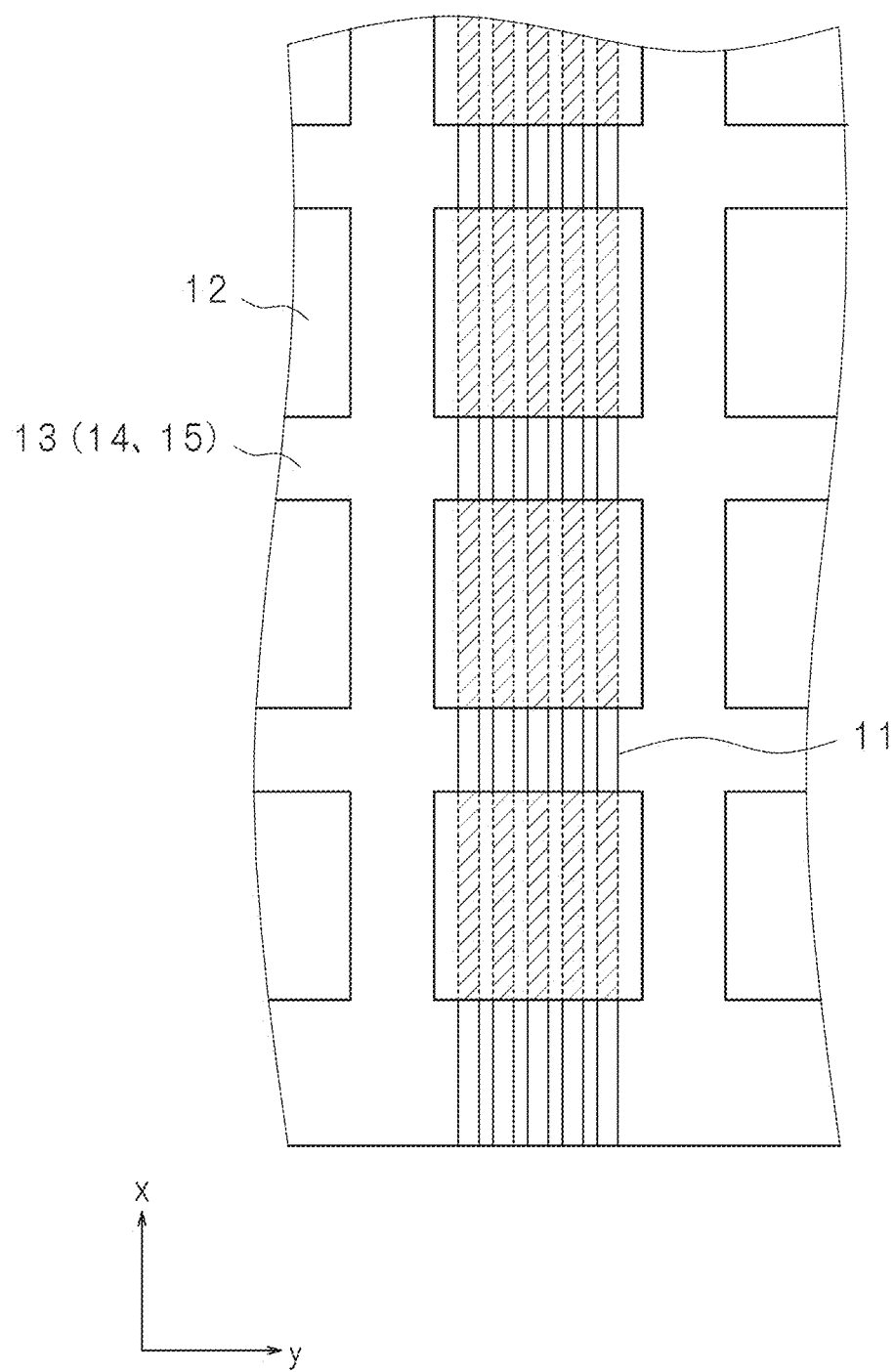
FIG. 13 illustrates an overlapping area of wirings and electrodes.

In the present embodiment, the area where each of the wirings 11 overlaps each electrode 12 via the second insulating layer 15 is the same for all the wirings 11. FIG. 13 illustrates an overlapping area of the wirings 11 and the electrodes 12. The overlapping portions of the wirings 11 and electrodes 12 are hatched in the illustration of FIG. 13. As described above, the wirings 11 extend under all the electrodes 12 aligned along the first direction x. In this case, each electrode 12 has the same rectangular shape with one side direction being the first direction x and the other side direction being the second direction y. Here, the multiple electrodes 12 are arrayed in matrix along the first direction x and the second direction y, and therefore the area where the wirings 11 overlap the electrodes 12, 12, 12 . . . in front view is the same for all the wirings 11. This allows the magnitude of the floating capacitance formed between the individual wirings 11 and the respective electrodes 12 to be the same for all the wirings 11. Accordingly, electric load is the same in the paths of the wirings 11, which enables uniform tactile presentation in the entire touch surface of the tactile presentation device 10.

While the multiple electrodes 12 have the same rectangular shape in the description above, the shape of the electrode 12 is not particularly limited in the present embodiment as long as the overlapping area of each wiring 11 and each electrode 12 is equal for all the wirings.

Figure 14A:
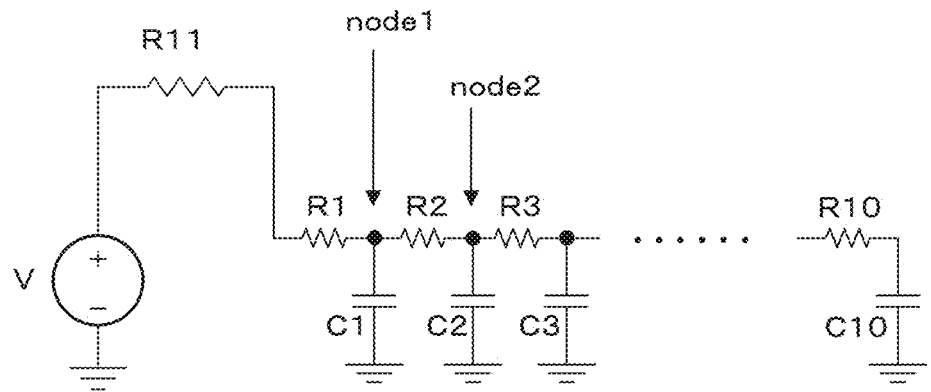
FIGS. 14A to 14C are circuit diagrams for the tactile presentation device.
Figure 14B:
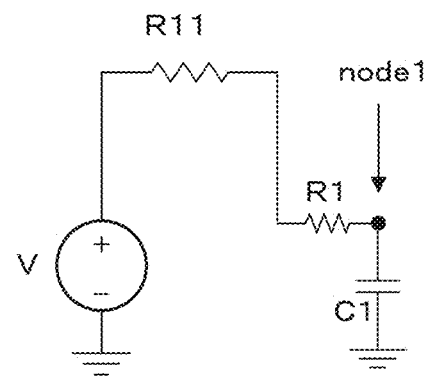
Figure 14C:
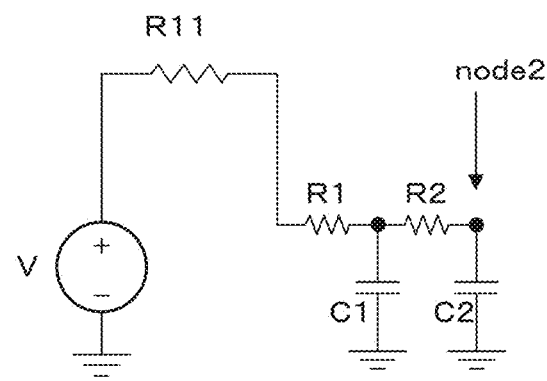

The following description illustrates an execution result of simulation, conducted by the present inventors, for the uniformity of tactile presentation by the configuration of the wirings 11 according to the present embodiment. FIGS. 14A-14C illustrate circuit diagrams of the tactile presentation device 10 which is a simulation target. FIG. 14A illustrates a circuit diagram of wiring paths to which pulse voltage V1 for tactile presentation is applied, in the tactile presentation device 10 according to the present embodiment. Furthermore, FIGS. 14B and 14C illustrate the circuit diagrams of the tactile presentation device 10 according to Embodiment 1 as comparative examples.

For example, it is assumed that ten electrodes 12 are arrayed in the first direction x. Here, as illustrated in FIG. 14A, an electric circuit is so configured to include internal resistances R1, R2, . . . R10, floating capacitances C1, C2, . . . C10 between the respective wirings 11 and electrodes 12, and an internal resistance R11 of the signal voltage source 17. Viewing from the input terminal 19, the internal resistances R1, R2, . . . respectively represent an internal resistance for the wiring 11 up to the first electrode 12, an internal resistance for the wiring 11 from the first electrode 12 to the second electrode 12, and so forth. The floating capacitances C1, C2, . . . respectively represent the floating capacitance between the first electrode 12 and the wiring 11, the floating capacitance between the second electrode 12 and the wiring 11, and so forth. Connection points node1, node2, . . . respectively represent the connection points between the internal resistances R1, R2 and the floating capacitance C1, the connection point between the internal resistances R2, R3 and the floating capacitance C2, and so forth.

Since the wirings 11 are covered with all the ten electrodes 12 aligned along the first direction x in the present embodiment, the floating capacitances C1, C2, . . . are formed between the electrodes 12, as illustrated in FIG. 14A. As illustrated in FIGS. 14B and 14C, on the other hand, the wirings 11 are covered with the first, second, third, . . . electrodes 12 respectively in Embodiment 1, which eliminates the need for consideration of the wiring paths ahead of the electrodes 12. That is, in the case where the wiring 11 is connected to the first electrode 12, for example, R1 is the only internal resistance of the wiring 11 and C1 is the only floating capacitance, as illustrated in FIG. 14B. Moreover, in the case where the wiring 11 is connected to the second electrode 12, for example, R1 and R2 are the only internal resistances of the wiring 11, and C1 and C2 are the only floating capacitances, as illustrated in FIG. 14C.

Figure 15A:
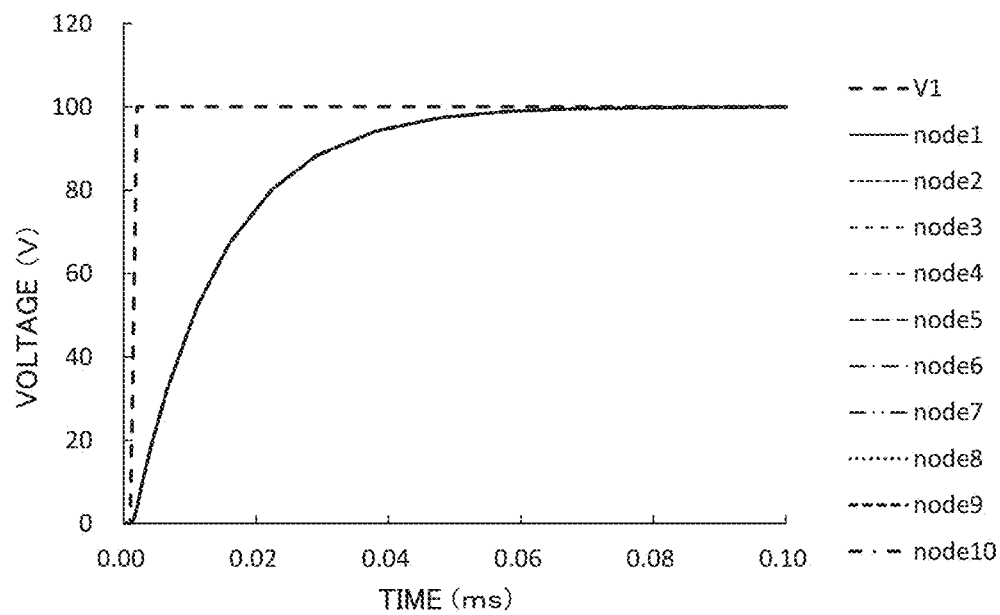
FIGS. 15A and 15B illustrate graphs illustrating simulation results concerning response speed for tactile presentation.
Figure 15B:
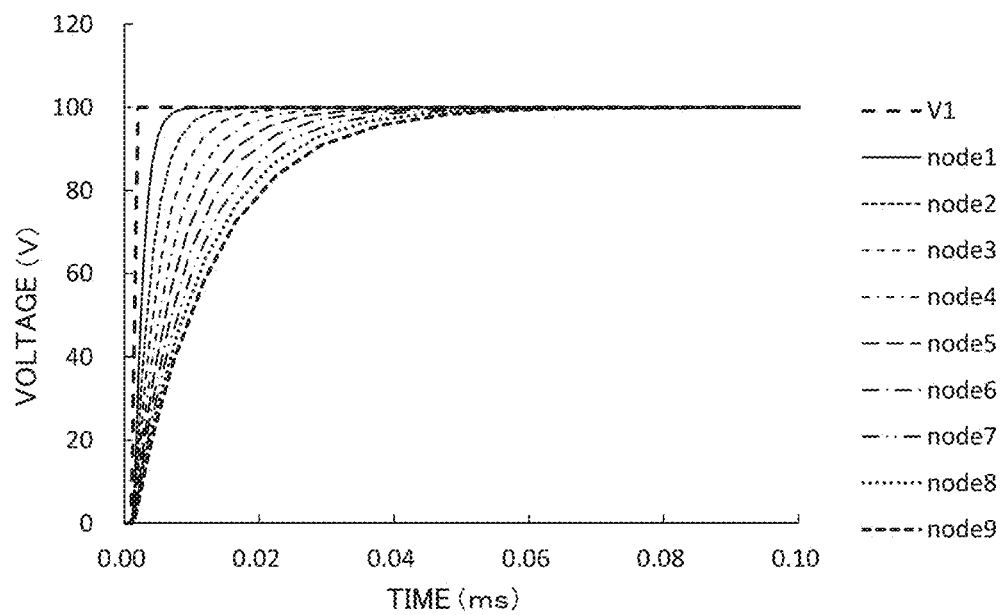

FIGS. 15A and 15B are graphs illustrating simulation results concerning the response speed of tactile presentation. In the graphs in FIGS. 15A and 15B, the horizontal axis indicates time (ms) whereas the vertical axis indicates voltage (V). FIG. 15A illustrates the simulation result for the tactile presentation device 10 according to the present embodiment, while FIG. 15B illustrates the simulation result for the tactile presentation device 10 according to Embodiment 1. In the simulations, the results of which are illustrated in FIGS. 15A and 15B, calculation was conducted assuming that the internal resistances R1, R2, . . . of the wiring 11 correspond to 0.32 k$\Omega$, the floating capacitances C1, C2, . . . correspond to 1.25 pF, and the internal resistance R11 of the signal voltage source 17 corresponds to 1000 k$\Omega$.

As illustrated in FIG. 15B, in the case where the individual wirings 11 have different lengths, as to a time-series change in the voltage value at each of the connecting points node1, node2, . . . , voltage rises later as the connection point is farther from the voltage signal source 17. That is, variation occurs in the response speed for tactile sense presentation for different electrodes 12. Meanwhile, as illustrated in FIG. 15A, in the case where the individual wirings 11 have the same length, the time-series change in the voltage value at each of the connecting points node1, node2, . . . is substantially the same. That is, no variation occurs in the response speed for the electrodes 12. Accordingly, by making all the wirings 11 have the same length, uniformity in tactile presentation on the entire touch surface of the tactile presentation device 10 may be secured.

Figure 16:
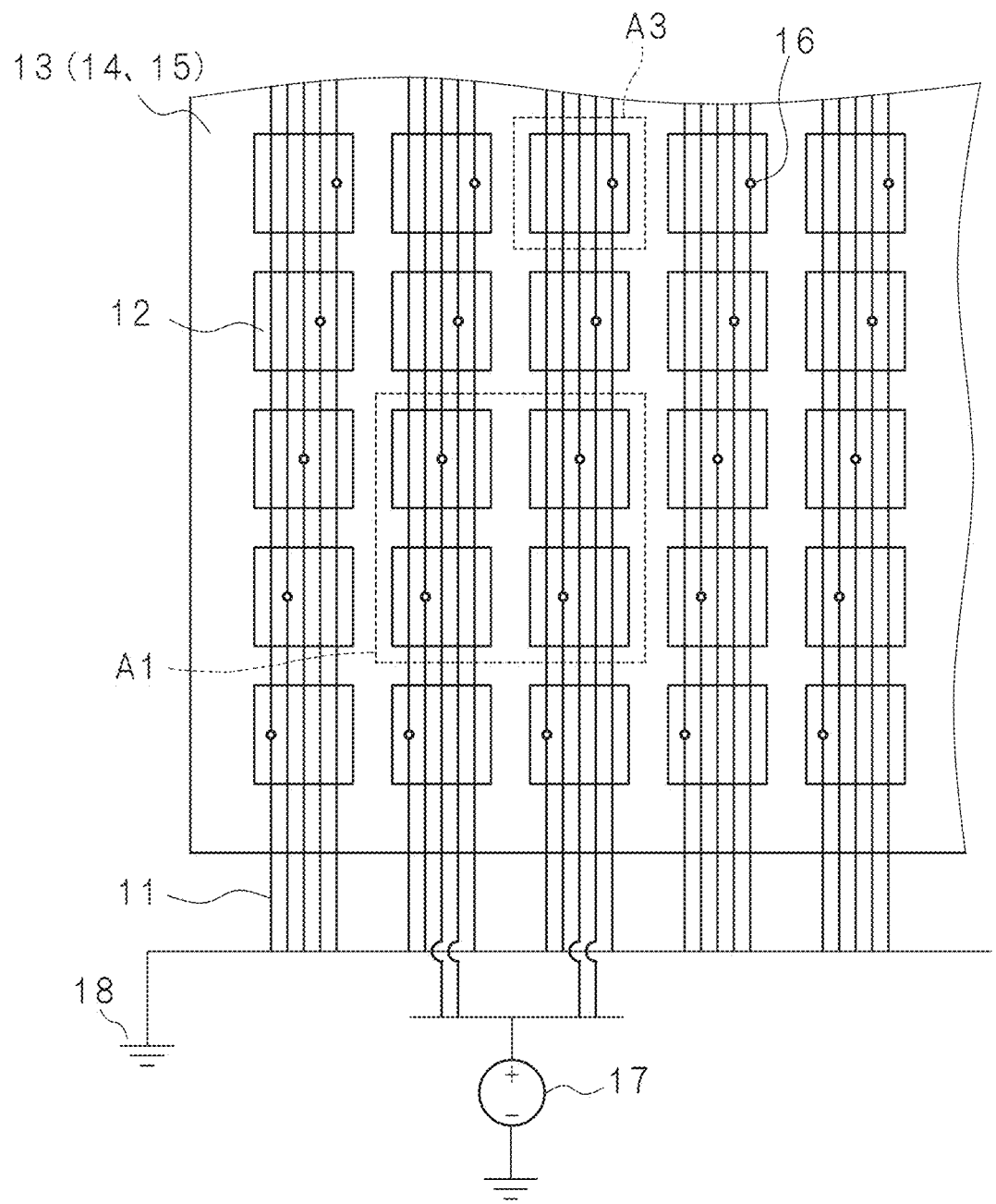
FIG. 16 is a schematic view illustrating tactile presentation in multiple portions.

FIG. 16 is a schematic view illustrating tactile presentation in multiple portions. The tactile presentation device 10 may present tactile sense in multiple portions by simultaneously outputting voltage signals to the electrodes 12 not only in one region A1 but also in another region A3. In this case, each of the electrodes 12 is supplied with voltage through different wirings 11. Since no consideration is made for the influence of voltage signals applied via other wirings 11 in the circuit diagram illustrated in FIG. 14A, the present inventors further conducted the following simulations for reviewing such influence.

FIGS. 17A and 17B are circuit diagrams in the case of presenting tactile sense in multiple portions. FIG. 17A illustrates the case where a voltage signal is applied to the fifth electrode 12 through another wiring 11. Moreover, FIG. 17B illustrates the case where a voltage signal is applied to the fifth and sixth electrodes 12 through the other wiring 11. Here, as illustrated in FIGS. 17A and 17B, a signal voltage source 17 (represented by pulse voltages V2 and V3 in FIGS. 17A and 17B) is additionally connected to the electrodes 12 described above. In the circuit diagrams in FIGS. 17A and 17B, the internal resistance, floating capacitance and the like in the wiring path concerning the other wiring 11 are not illustrated for the sake of simplicity. The simulation results for the circuit configurations illustrated in FIGS. 17A and 17B will be described below.

Figure 18A:
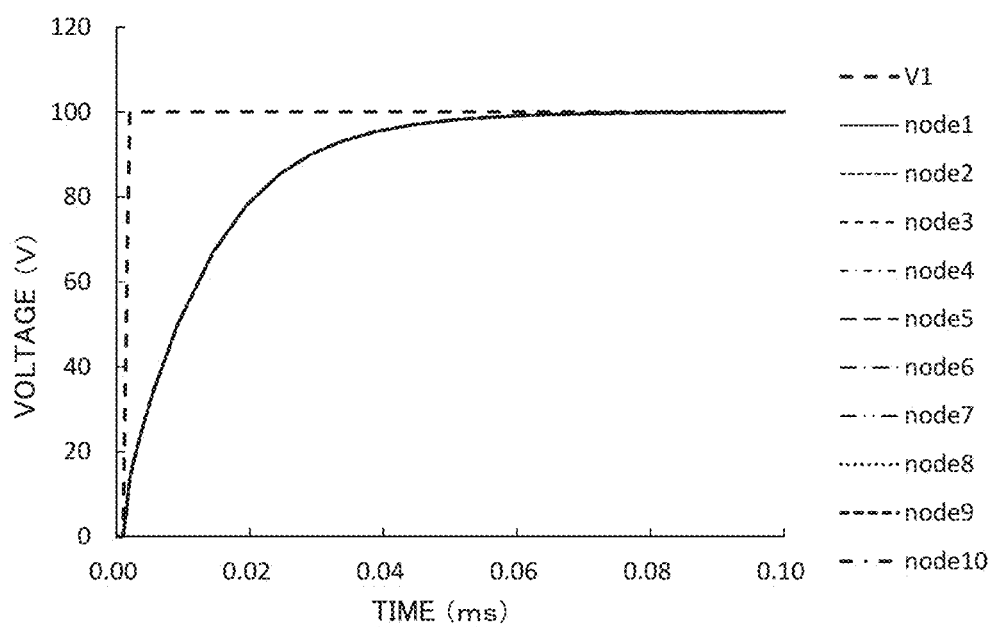
FIGS. 18A and 18B are graphs illustrating simulation results in the case of presenting tactile sense in multiple portions.
Figure 18B:
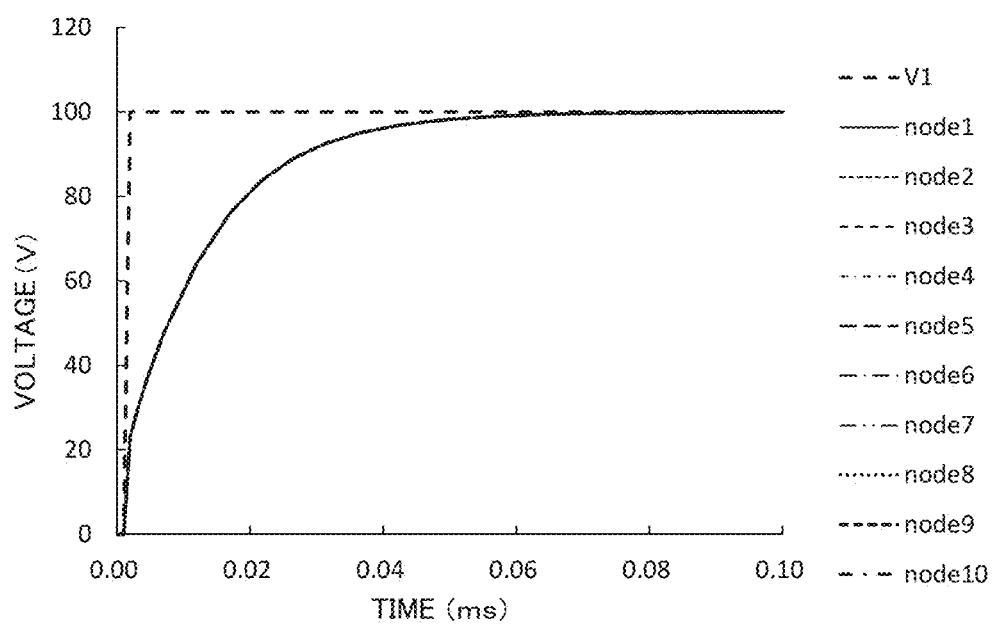

FIGS. 18A and 18B are graphs illustrating simulation results in the case of presenting tactile sense in multiple portions. FIG. 18A illustrates a simulation result related to the circuit configuration illustrated in FIG. 17A. FIG. 18B illustrates a simulation result related to the circuit configuration illustrated in FIG. 17B. As illustrated in FIGS. 18A and 18B, in any circuit configuration, the time-series change in the voltage value at each of the connecting points node1, node2, . . . is substantially the same. Thus, even in the case where tactile presentation is performed in multiple portions, uniform tactile presentation may be achieved.

Figure 19A:
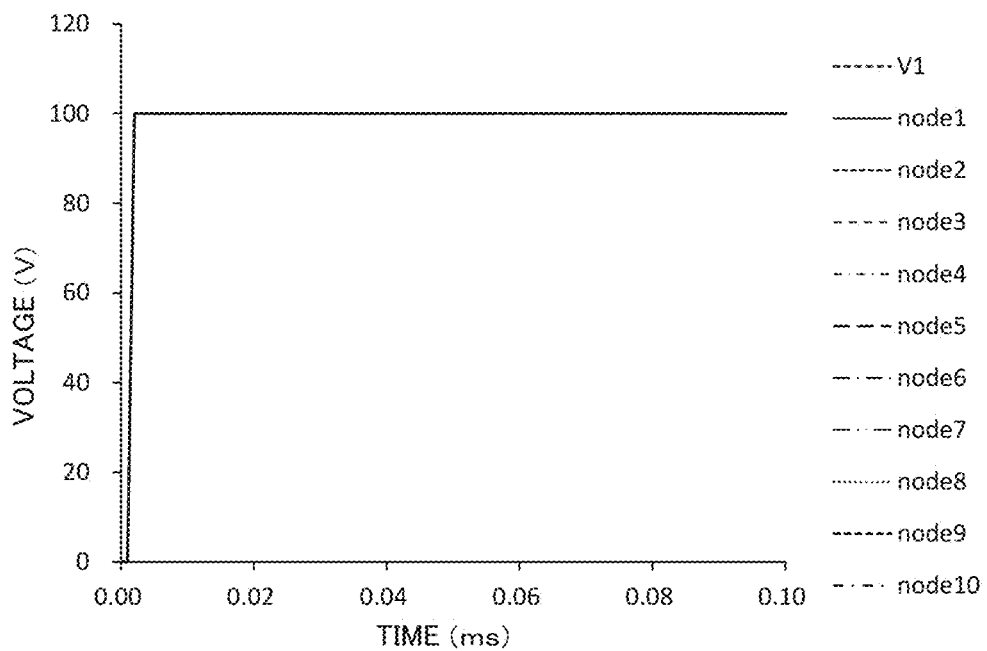
FIGS. 19A and 19B are graphs illustrating simulation results related to a difference in the internal resistance of the signal voltage source.
Figure 19B:
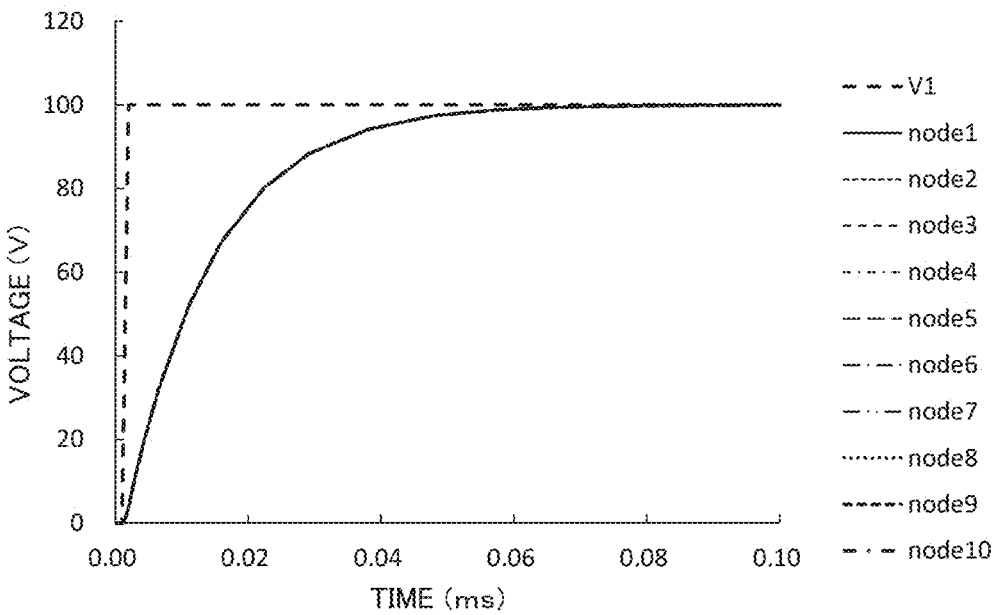

FIGS. 19A and 19B are graphs illustrating simulation results related to the difference in the internal resistance R11 of the signal voltage source 17. FIGS. 19A and 19B illustrate the results of simulation according to the magnitude, i.e. low and high respectively, of the internal resistance R11 of the signal voltage source 17 in the circuit configuration illustrated in FIG. 14A. FIG. 19A illustrates the simulation result in the case where the internal resistance R11 of the signal voltage source 17 is 100Ω whereas FIG. 19B illustrates the simulation result in the case where the internal resistance R11 is 1000 kΩ. As illustrated in FIGS. 19A and 19B, even if the value of the internal resistance R11 is changed, no variation is found for the change in the voltage value of the connecting points node1, node2, . . . in the simulation results. Therefore, regardless of the magnitude of the internal resistance R11 of the signal voltage source 17, uniform tactile presentation may be attained. Since the internal resistance R11 in FIG. 19A is significantly lower than the internal resistance R11 in FIG. 19B, the voltage value illustrated in FIG. 19A rises earlier than that in FIG. 19B.

According to Embodiment 2, therefore, the same length of the wirings 11 allows for uniform tactile presentation on the entire touch surface.

Embodiment 3

In the present embodiment, a form of reducing the development of unwanted tactile sense due to a wiring 11 exposed between adjacent electrodes 12 and 12 will be described.

Figure 20:
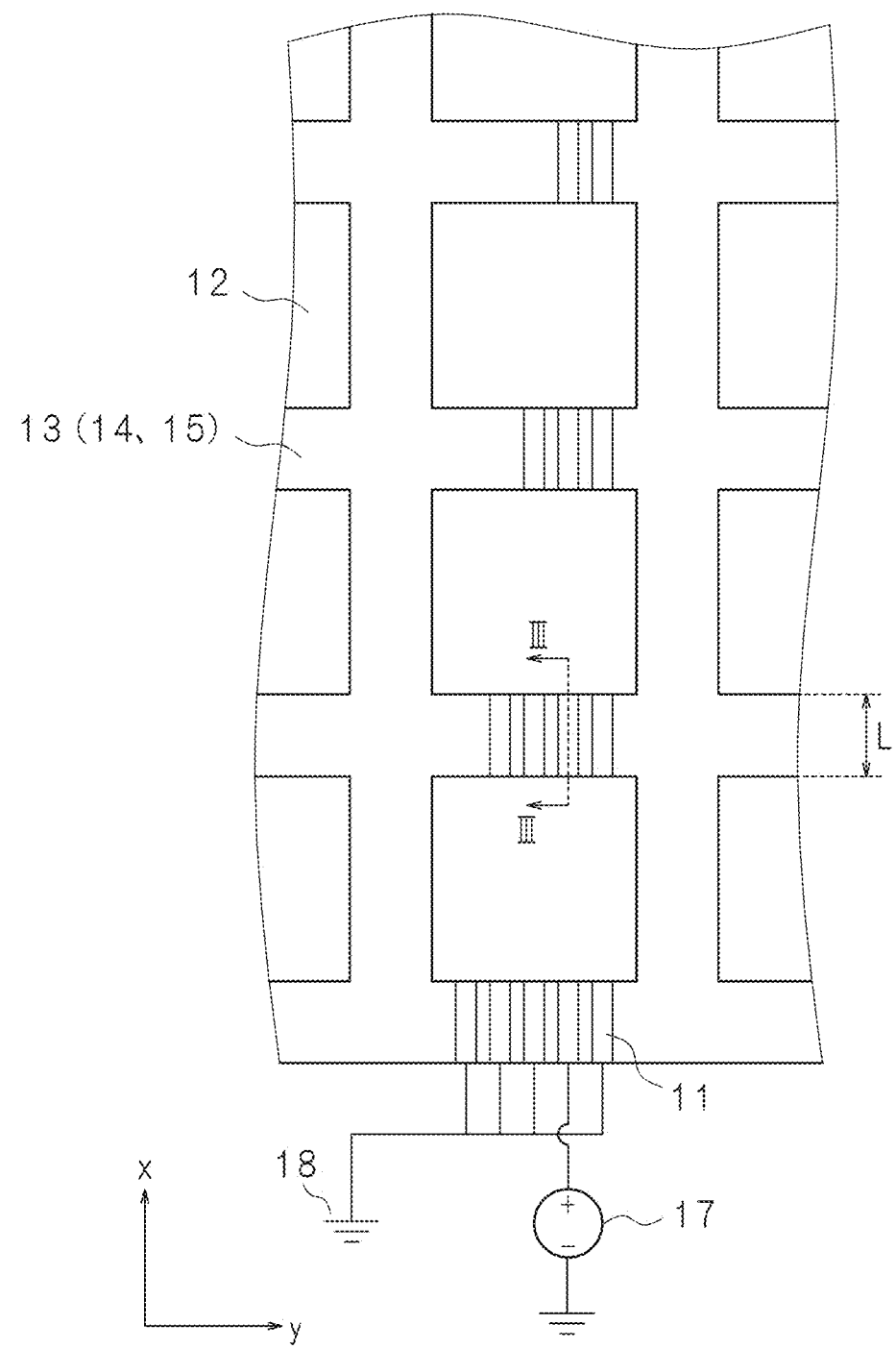
FIG. 20 is a partial enlarged view illustrating a configuration example of a tactile presentation device.

FIG. 20 is a partial enlarged view illustrating a configuration example of a tactile presentation device 10. FIG. 20 illustrates an enlarged view of a portion of the tactile presentation device 10 illustrated as a front view in FIG. 4. Here, a distance between the electrodes 12 adjacent to each other that are disposed on the same wiring 11 is represented by L. That is, the distance between the adjacent electrodes 12 and 12 in the first direction x is assumed as L.

As in Embodiments 1 and 2, tactile sense is to be presented for a part of the electrodes 12. That is, as illustrated in FIG. 20, it is assumed that a part of the wirings 11 is connected to the signal voltage source 17. Here, the influence of a leakage electric field leaking out from the wirings 11 at a gap portion between the adjacent electrodes 12 and 12 in the first direction x will be discussed.

Figure 21:
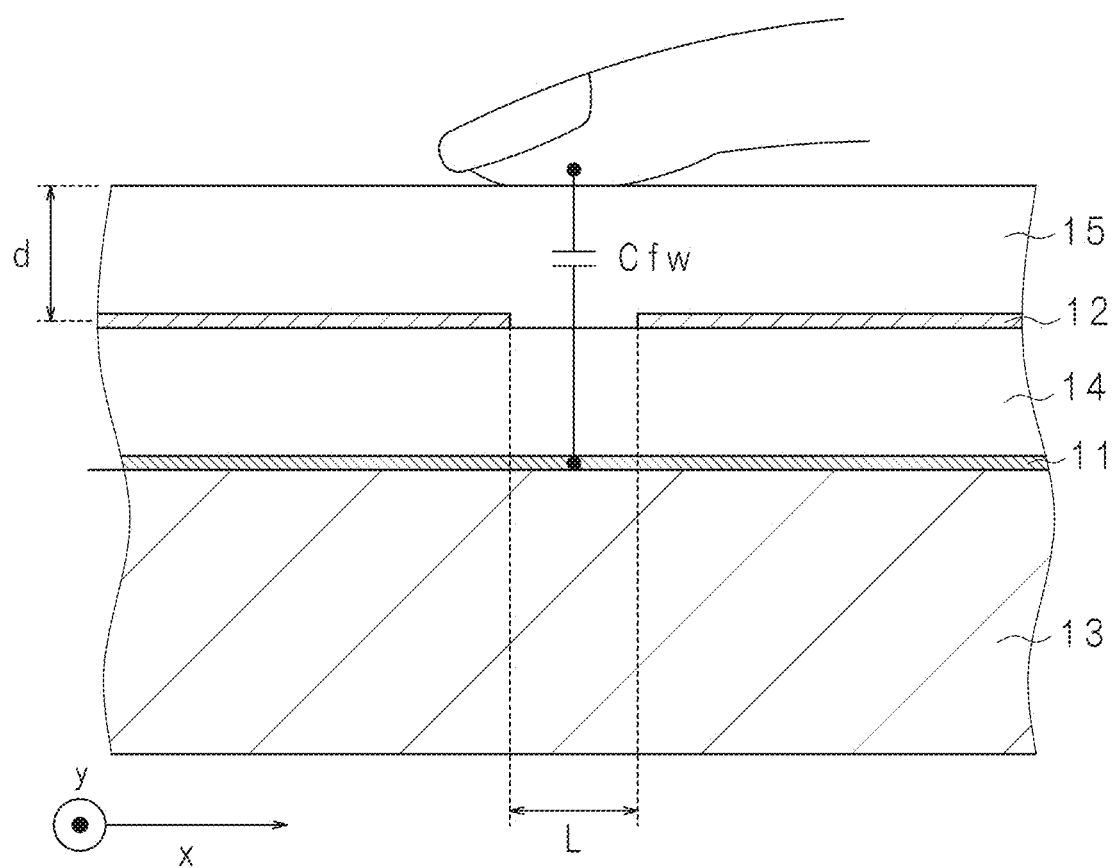
FIG. 21 illustrates the development of unwanted tactile sense.

FIG. 21 illustrates the development of unwanted tactile sense. FIG. 21 illustrates a partial section view of the cross section of the tactile presentation device 10 along the line III-III on the wirings 11 illustrated in FIG. 20. For the convenience of illustration, no hatching is added to the first insulating layer 14 and the second insulating layer 15 in FIG. 21. As described above, the adjacent electrodes 12 and 12 are disposed along the first direction x at the interval L.

Moreover, the thickness of the second insulating layer 15 covering the electrodes 12 is assumed as d. That is, in the case where a user's finger touches the second insulating layer 15, the distance between the user's finger and the electrodes 12 is represented by d. Here, as illustrated in FIG. 21, a case is discussed where the user's finger touches the surface of the second insulating layer 15, i.e. the touch surface.

In this case, the leakage electric field from the wiring 11 is shielded by the electrodes 12 in a portion covered with the electrodes 12. Meanwhile, as a gap is generated between the electrodes 12 and 12 with the interval L, the leakage electric field from the wiring 11 generates an electric field component that passes through the gap portion and moves toward the surface of the second insulating layer 15. In the case where a user's finger touches the surface of the second insulating layer 15 corresponding to the gap portion, electrostatic coupling occurs between the wiring 11 and the finger. That is, unwanted tactile sense is developed. In the description below, the electrostatic capacitance in the electrostatic coupling generated between the wiring 11 and the user's finger in the gap between the electrodes 12 and 12 will be represented by Cfw.

In the present embodiment, the electrode 12 and the second insulating layer 15 are so configured as to reduce the development of unwanted tactile sense in the gap portion between the electrodes 12 and 12. More specifically, they are so configured that the interval L between the electrodes 12 and 12 is smaller than the thickness d of the second insulating layer 15.

Figure 22A:
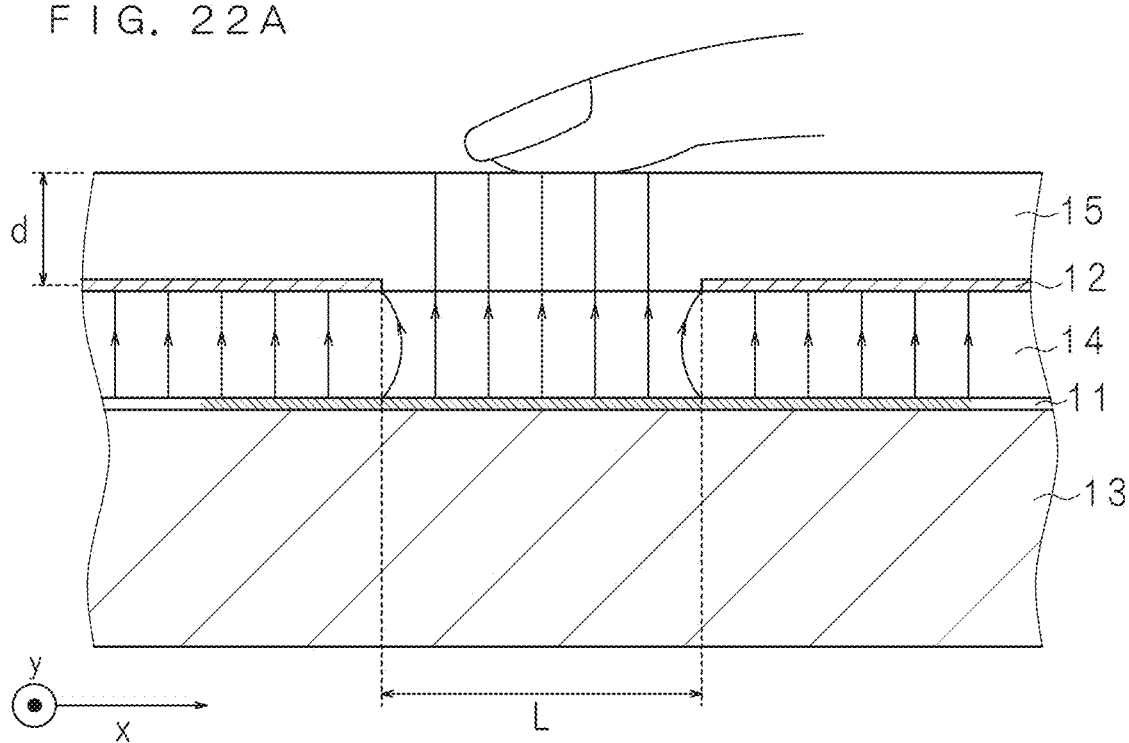
FIGS. 22A and 22B illustrate the relationship between the interval of the electrodes and the thickness of the second insulating layer.
Figure 22B:
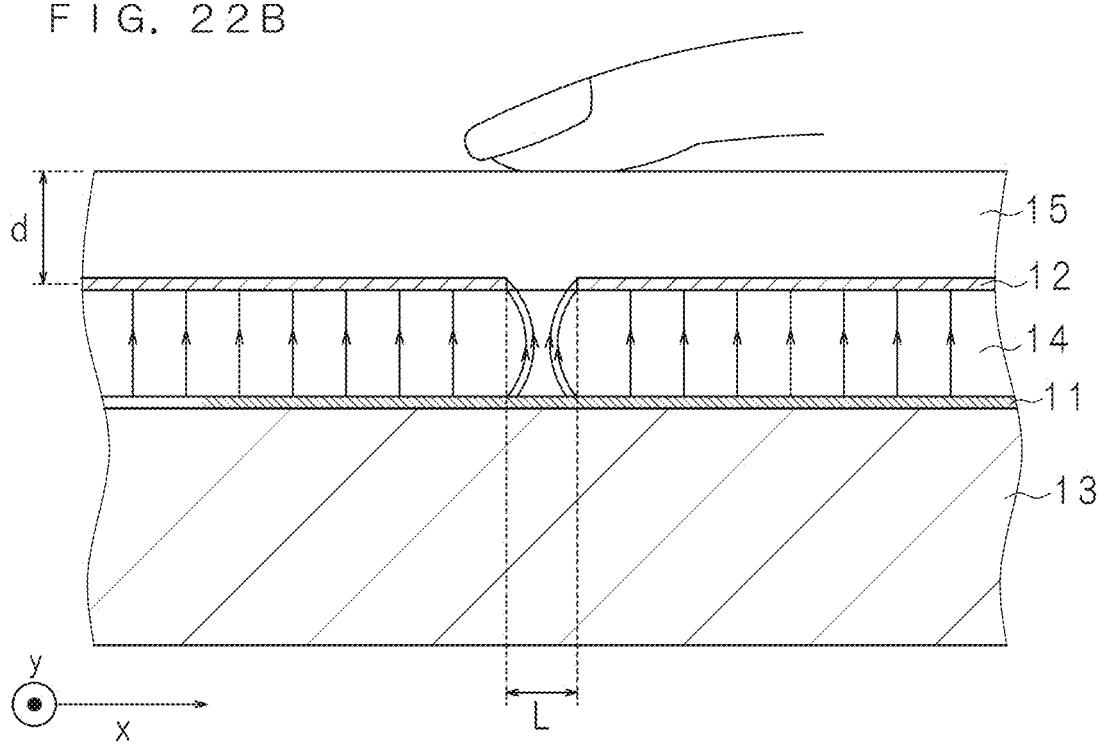

FIGS. 22A and 22B illustrate the relationship between the interval L and the thickness d. FIG. 22A illustrates the configuration where the interval L is larger than the thickness d, while FIG. 22B illustrates the configuration where the interval L is smaller than the thickness d. If the interval L with respect to the thickness d is relatively large, a leakage electric field is generated from the extension portion of the wiring 11 located between the electrodes 12 and 12, and the electric field component in a large part of the leakage electric field passes through the gap and leaks out to the second insulating layer 15 side. That is, as illustrated in FIG. 22A, electrostatic coupling is generated between the wiring 11 and the finger, which develops unwanted tactile sense.

If, on the other hand, the interval L is relatively small with respect to the thickness d, the component in a large part of the leakage electric field in the gap portion is shielded by the electrode 12, which reduces a component leaking out to the second insulating layer 15 side. That is, as illustrated in FIG. 22B, electric coupling between the wiring 11 and the electrode 12 is dominant. Accordingly, the electrode 12 and the second insulating layer 15 are so configured that the distance of the interval L is smaller relative to the thickness d, thereby reducing the influence of unwanted tactile sense.

Figure 23A:
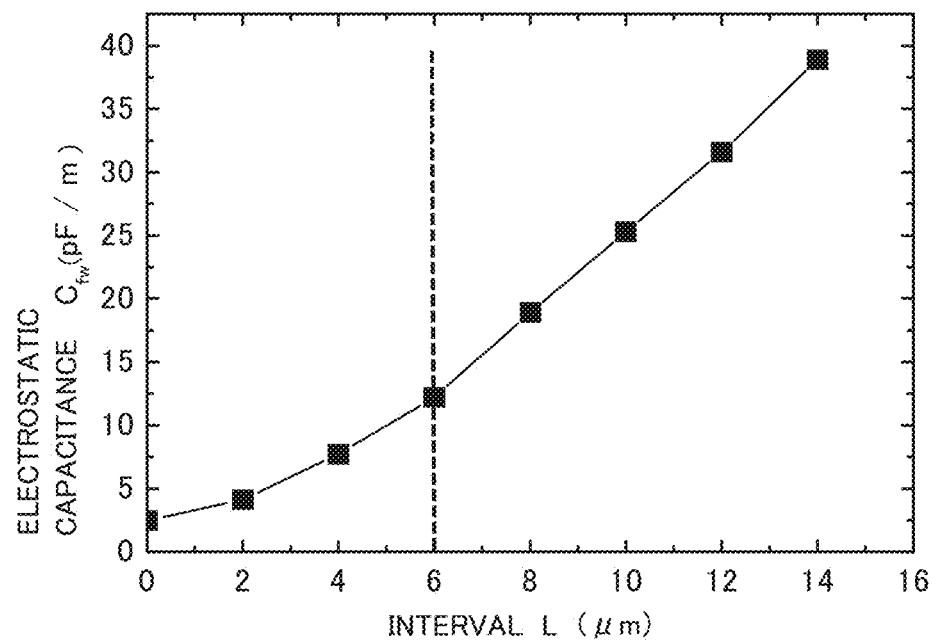
FIGS. 23A and 23B are graphs illustrating simulation results executed for the relationship between the electrostatic capacitance and the interval of the electrodes.
Figure 23B:
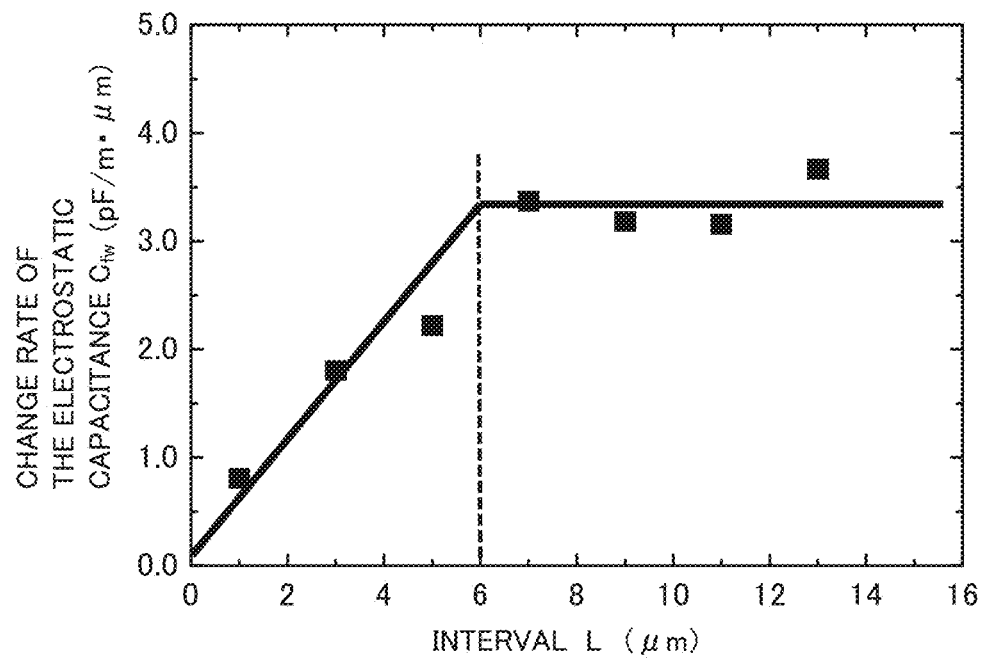

FIGS. 23A and 23B are graphs illustrating the simulation results obtained by reviewing the relationship between the electrostatic capacitance Cfw and the distance L between the electrodes 12 and 12. FIG. 23A is a graph illustrating simulation values of the electrostatic capacitance Cfw for the interval L. In FIG. 23A, the horizontal axis indicates the interval L (μm) whereas the vertical axis indicates the electrostatic capacitance Cfw (pF/m). FIG. 23B is a graph illustrating simulation values of the change rate of the electrostatic capacitance Cfw with respect to the interval L. In FIG. 23B, the horizontal axis indicates the interval L (μm) whereas the vertical axis indicates the change rate (pF/m·μm). In the simulation of FIGS. 23A and 23B, the first insulating layer 14, the second insulating layer 15 and the substrate 13 are assumed to have the thicknesses of 6.0 μm, 1.5 μm and 500 μm, respectively, and the relative permittivity of 4.0, 1.5 and 5.5, respectively.

As illustrated in FIGS. 23A and 23B, the electrostatic capacitance Cfw changes in different manners with the boundary set at a point where the interval L between the electrodes 12 and 12 corresponds to the thickness d (6.0 μm) of the second insulating layer 15. More specifically, if L>d, the change rate of the electrostatic capacitance Cfw is substantially constant, while the electrostatic capacitance Cfw increases in proportion to the interval L. If L<d, on the other hand, the change rate of the electrostatic capacitance Cfw decreases as the interval L is smaller, while the electrostatic capacitance Cfw changes as the exponential function of the interval L. The simulation results mean that the electric coupling between the wiring 11 and the electrode 12 is dominant if L is smaller than d, with the point where the interval L corresponds to the thickness d being a critical point. As described above, the electrode 12 and the second insulating layer 15 are so configured that L is smaller than d, which can further reduce the influence of unwanted tactile sense.

According to Embodiment 3, therefore, the interval L between the electrodes 12 is made smaller than the thickness d of the second insulating layer 15, so that the development of unwanted tactile sense may further be reduced.

Embodiment 4

Figure 24:
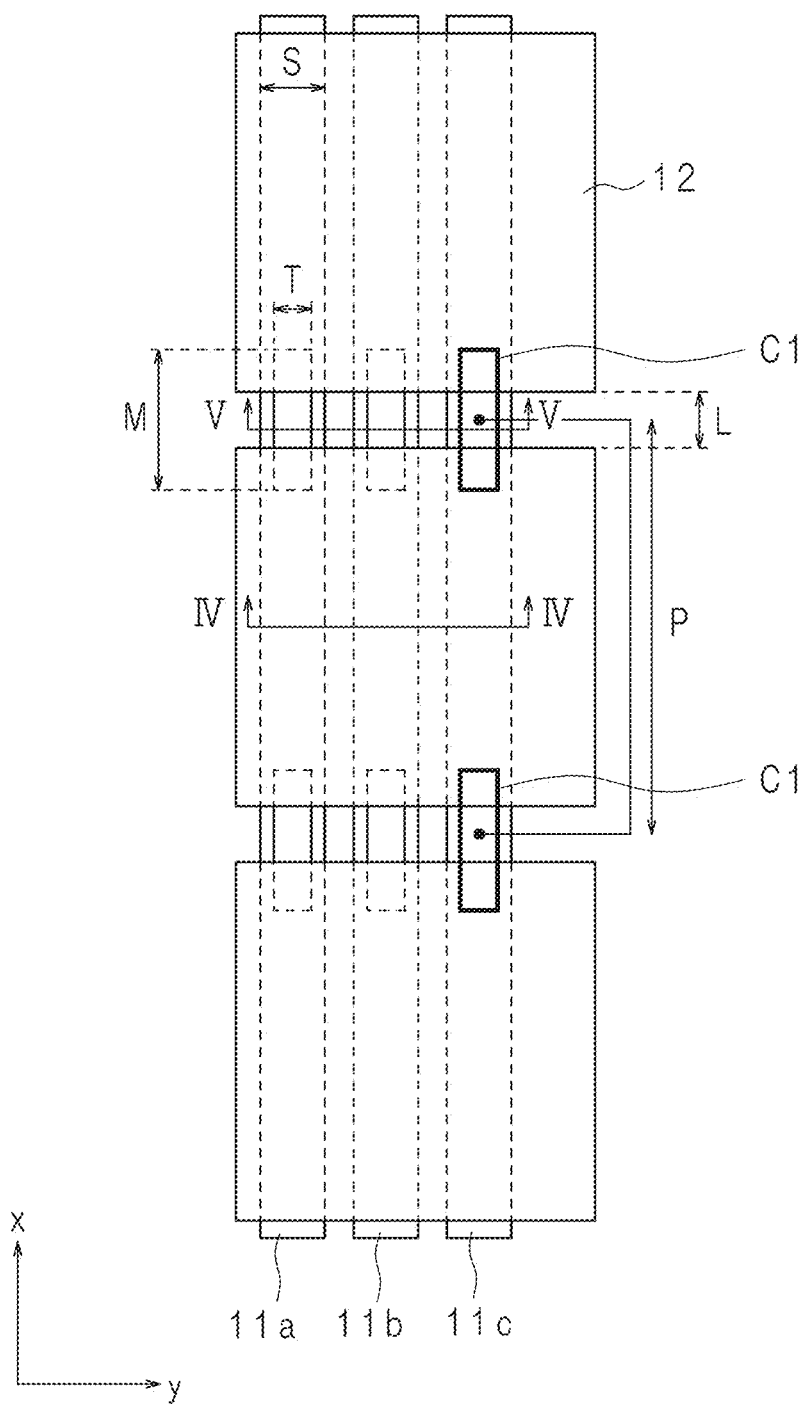
FIG. 24 is a partial enlarged view illustrating a configuration example of the tactile presentation device.
Figure 25A:
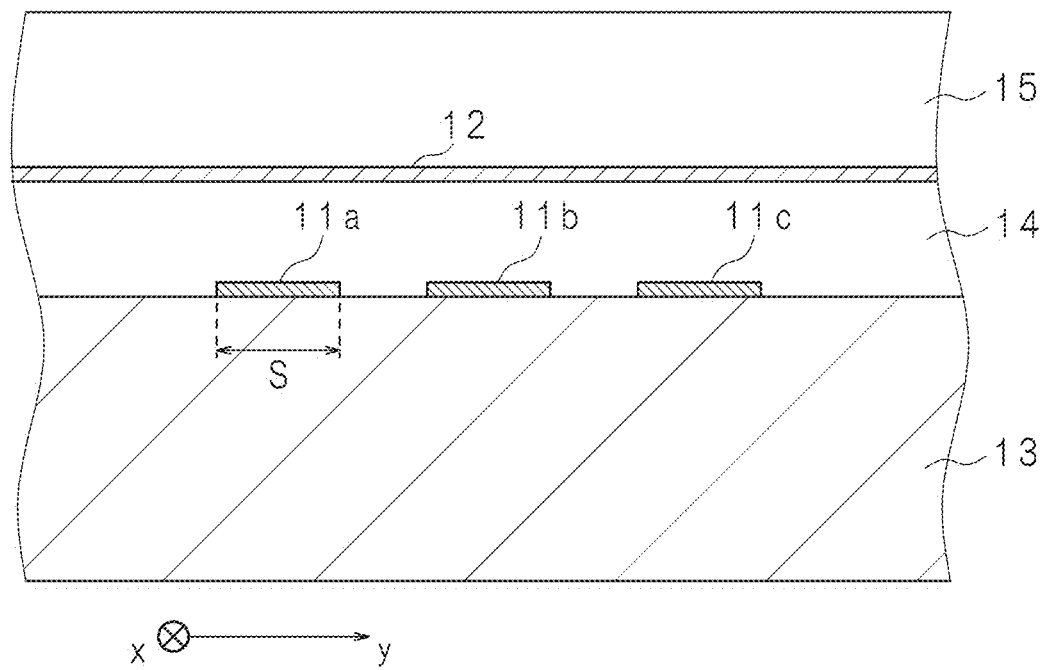
FIGS. 25A and 25B are partial section views illustrating configuration examples of the tactile presentation device.
Figure 25B:
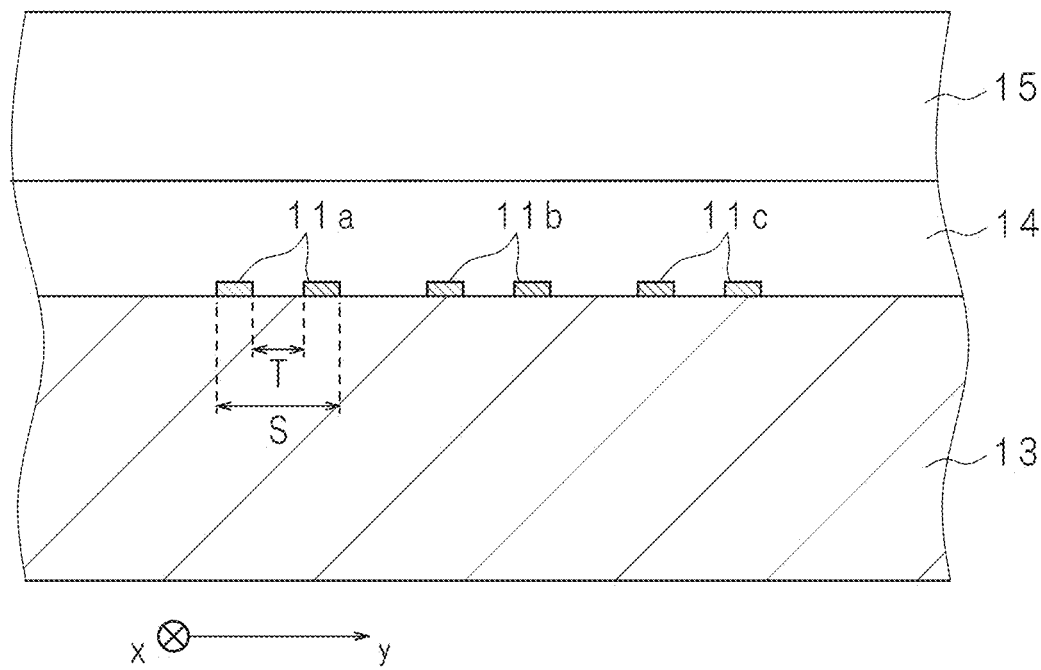
Figure 26:
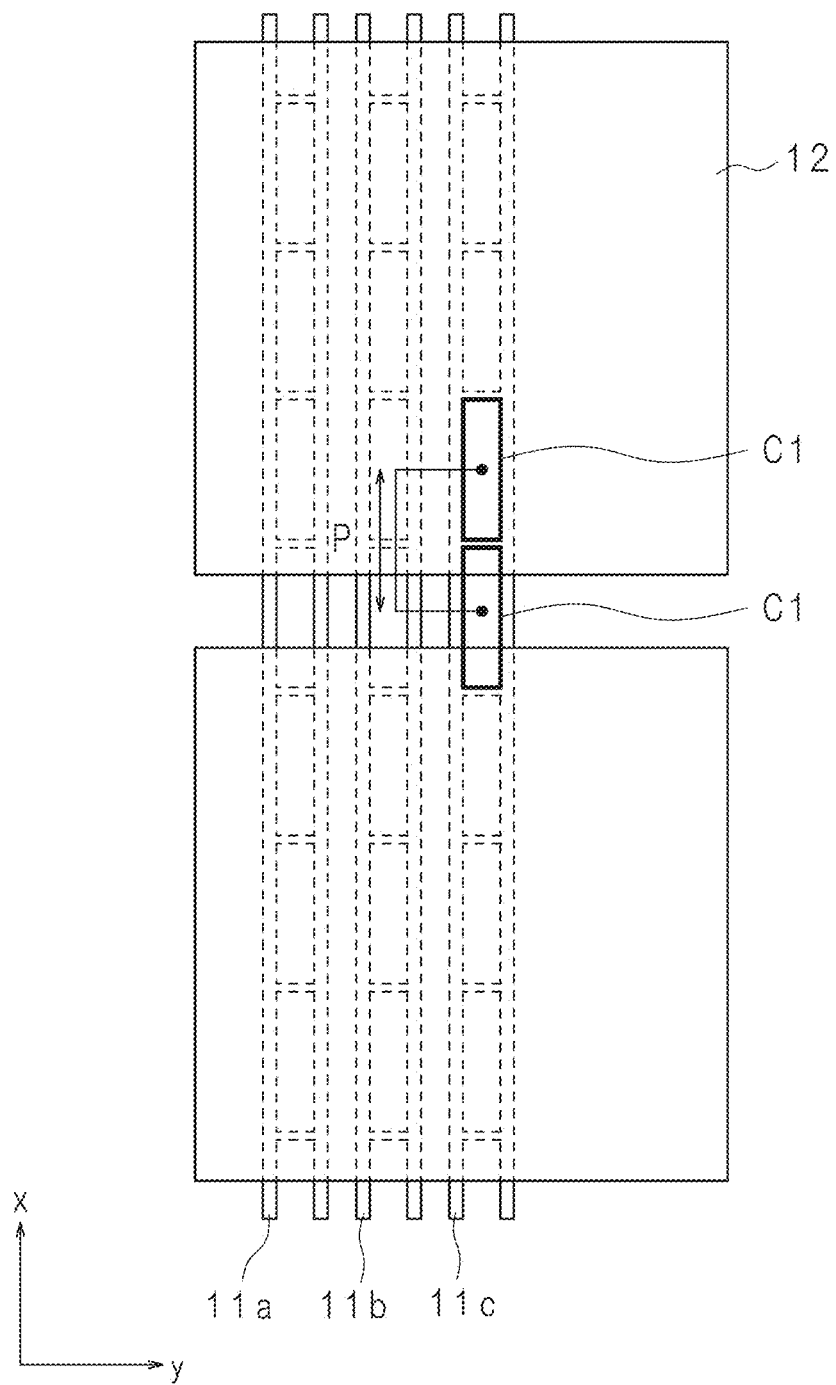
FIG. 26 illustrates another example of Embodiment 4.

In the present embodiment, a form of reducing the area of the wirings 11 exposed between adjacent electrodes 12 and 12 will be described. FIG. 24 is a partial enlarged view illustrating a configuration example of the tactile presentation device 10. FIG. 24 illustrates an enlarged view of a portion of the tactile presentation device 10 illustrated as a front view in FIG. 4. FIG. 25A illustrates the cross-section along the line IV-IV in FIG. 24. FIG. 25B illustrates the cross-section along the line V-V in FIG. 24.

As illustrated in FIG. 24, the wirings 11 (11a to 11c) are provided with cutout holes C1 formed by cutting out a rectangular shape the substantially middle parts of the wiring patterns at a constant interval along the first direction x which is parallel to signal input. More specifically, the cutout holes C1 are opened at positions in the gap L generated between the electrodes 12 and 12 at an interval P substantially equal to the alignment interval of the electrodes 12. The cutout holes C1 are configured to be the same for all the wirings 11a to 11c illustrated in the enlarged view of FIG. 24. Also, the same configuration may be employed for all the wirings 11 illustrated in FIG. 4.

Here, the width of the wiring 11 is indicated as S, the width of the cutout hole C1 parallel to the width direction of the wiring 11 is indicated as T, and the width of the cutout hole C1 parallel to the extending direction of the wiring 11 is indicated as M. Each cutout hole C1 is formed to have the width M longer than the gap L in the extending direction so as to bridge over the gap L.

As illustrated in FIG. 25A, in the wirings 11 covered with the electrode 12, electrostatic coupling is generated between a wiring 11 and a finger within the range of the width S. In comparison, as illustrated in FIG. 25B, the effective wiring width in the gap L is (S−T), and thus the capacitance generated at the gap L is smaller compared to that in the embodiments described above. That is, the electrostatic coupling between the wiring 11 and the finger at the gap L generated between the electrodes 12 and 12 is made smaller, thereby reducing unwanted tactile sense.

Figure 27A:
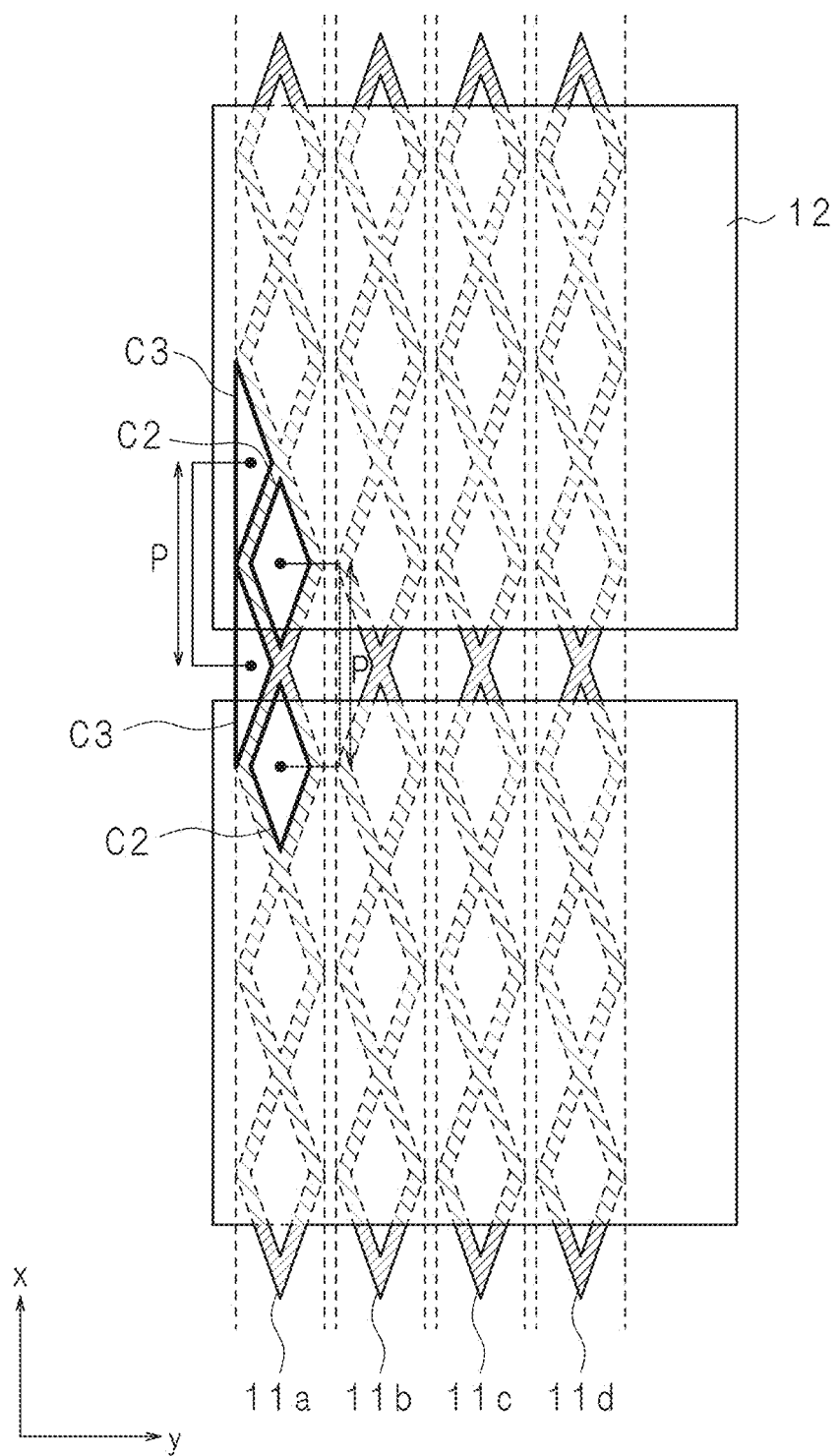
Figure 28A:
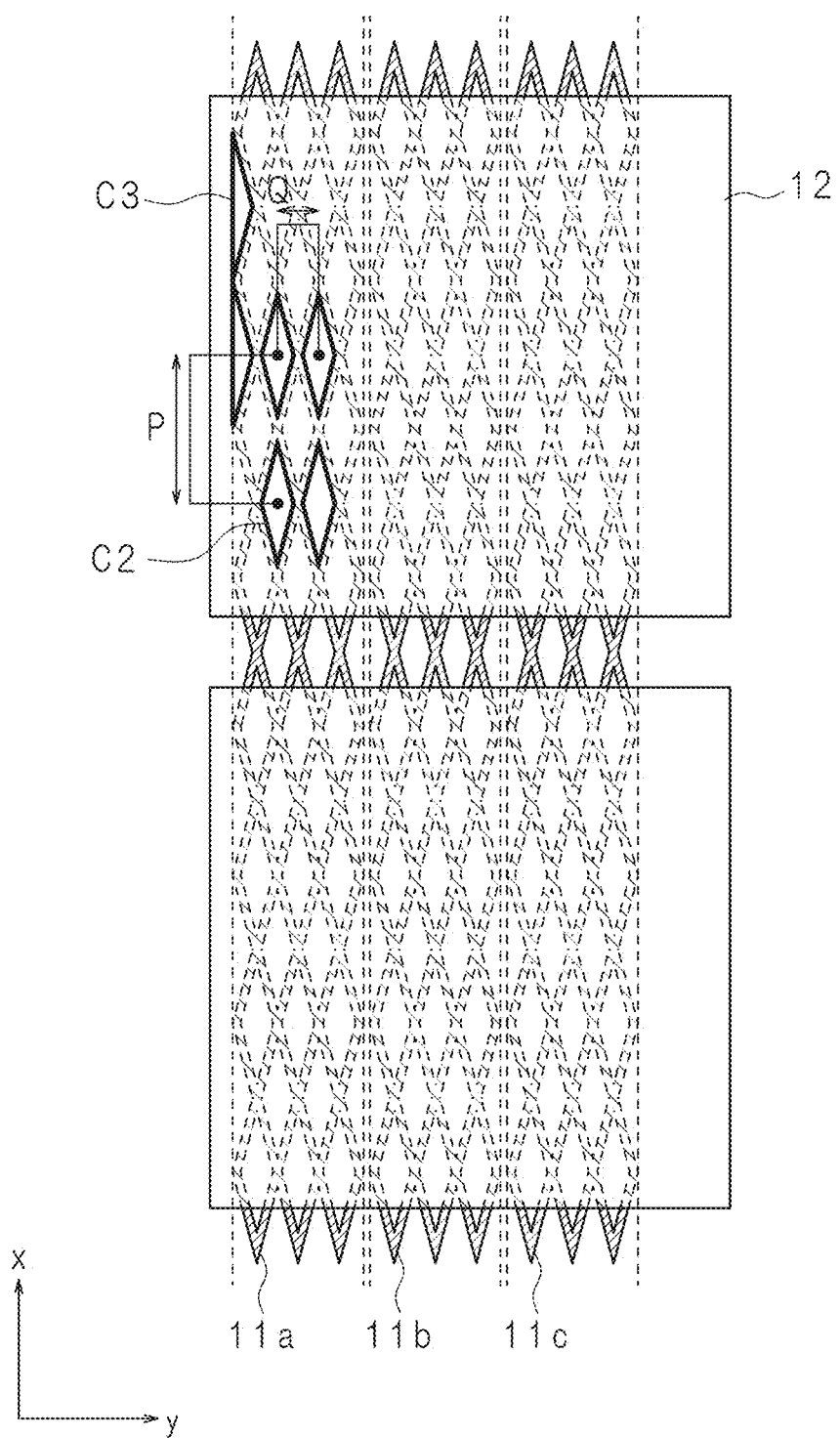
FIGS. 28A and 28B illustrate another example of Embodiment 4.
Figure 28B:
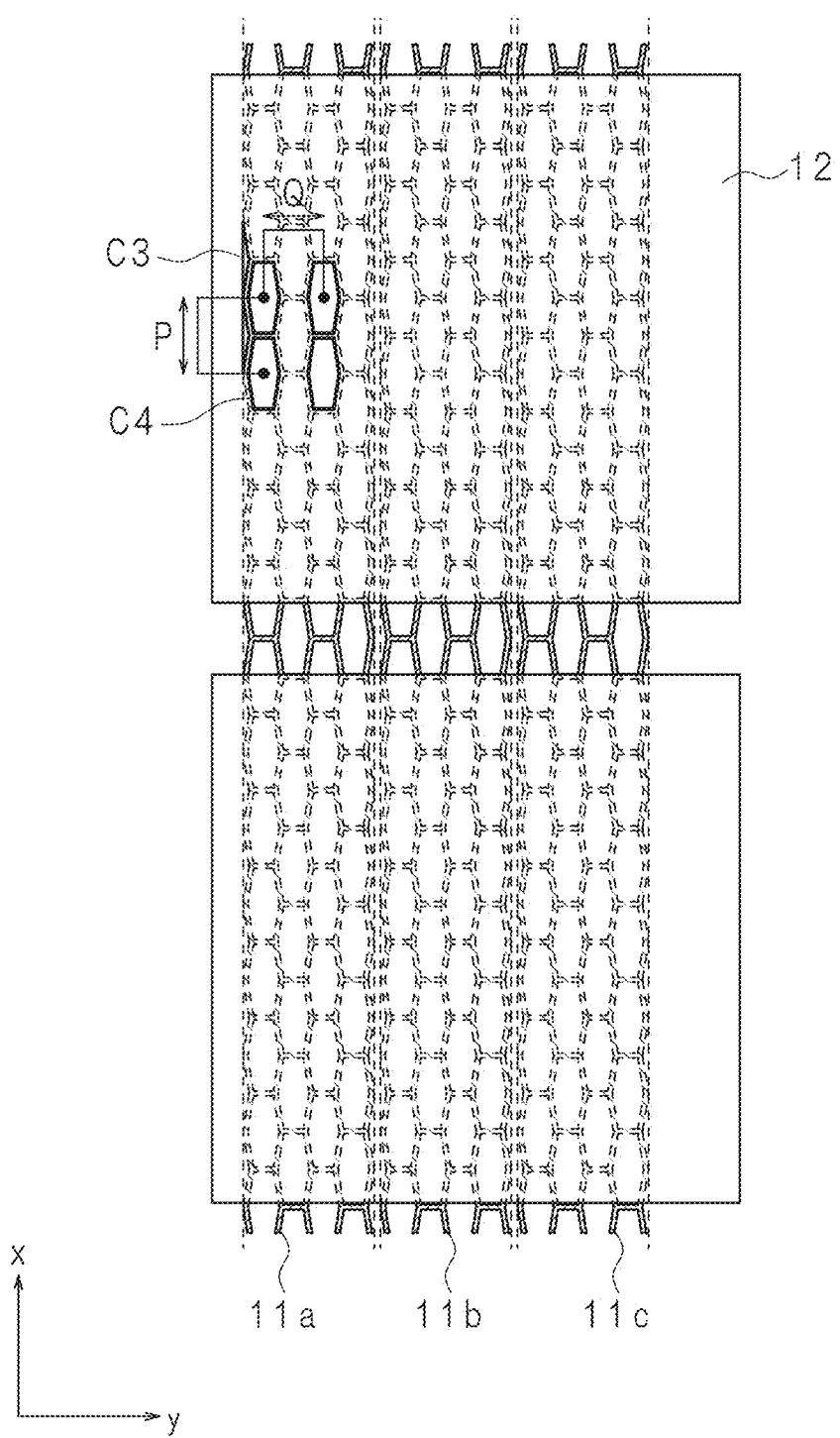
Figure 29:
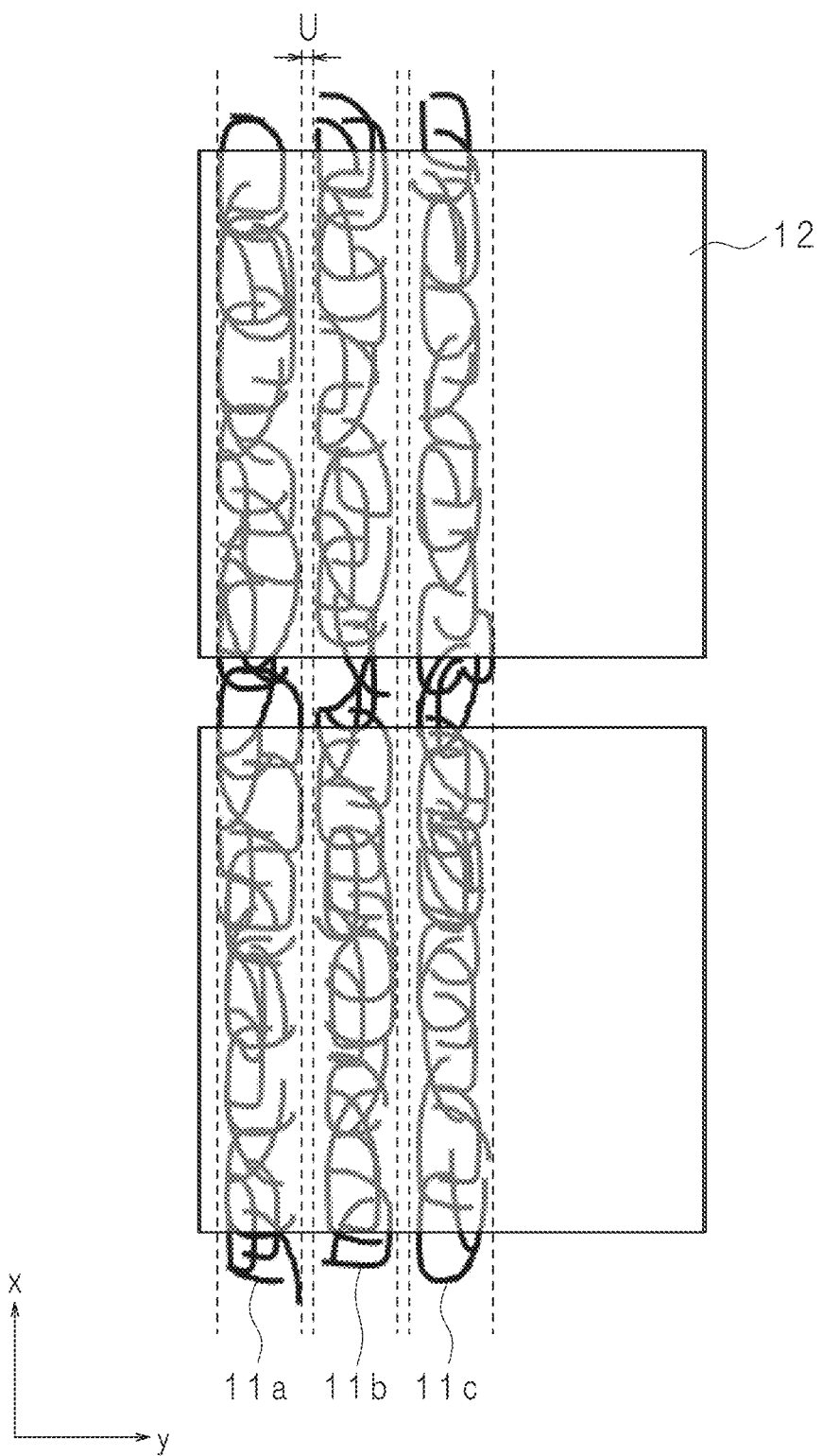
FIG. 29 illustrates another example of Embodiment 4.

FIGS. 26 to 29 illustrate other examples of the present embodiment in enlarged views of portions of the tactile presentation device 10 in front view. FIGS. 27A to 28B illustrate portions of the wirings 11 by hatching for convenience of illustration. In FIG. 29, the wirings 11 are represented by drawn lines.

In the example of FIG. 24, the cutout holes C1 are arranged at the same interval P as the alignment interval of the electrodes 12. In comparison, in the example of FIG. 26, the cutout holes C1 are arranged at the interval P smaller than the alignment interval of electrodes 12. That is, the cutout holes C1 are contiguously formed in the wirings 11 along the first direction x while bridging over the portions covered with the electrodes 12 and the portions of the gaps L.

The electrodes 12 are made of conductive material which is transmissive to visible light, and therefore transmits light. Thus, when the panel is viewed from the front, the light transmission to the underlying wirings 11 affects display. If each of the wirings 11 is made of an opaque member, light transmission is generated in the wirings 11 at portions of the cutout holes C1. If, on the other hand, each of the wirings 11 is made of a transparent member, the light transmittance is increased at the portions of the cutout holes C1. In any case, the light transmittance varies between the portions of the cutout holes C1 and the other portions. In the example of FIG. 24, the interval of electrode alignment corresponds to the interval P of the cutout holes C1. As such, the transmitted light is more intense at portions corresponding to the cutout holes C1 when the panel is viewed from the front, possibly deteriorating the appearance of display. According to the present embodiment, the arrangement of the cutout holes C1 inside the wirings 11 at the alignment interval P smaller than the interval of the electrodes allows the light transmittance to be substantially equal across the entire area of the panel, thereby achieving favorable appearance.

FIG. 27A illustrates an example where diamond cutout holes C2 and triangle cutout holes C3 are formed in the wirings 11. FIG. 27B illustrates an example where hexagonal cutout holes C4 and triangle cutout holes C3 are formed. Any of the cutout holes are aligned contiguously in the wirings 11 along the first direction x at the interval P. As described above, the cutout holes may also be formed by the combination of multiple polygons, not only rectangles. In this case also, the electrostatic coupling between the wiring 11 and the finger at the gap L generated between the electrodes 12 and 12 is made smaller, thereby reducing unwanted tactile sense. Furthermore, since the substantially equal light transmittance may be attained across the entire area of the panel, favorable appearance may be achieved.

FIGS. 28A and 28B illustrate examples where the cutout holes are formed contiguously at constant intervals in the first direction x and the second direction y of the wirings 11. Here, the cutout holes are aligned in one wiring not only in the first direction x which is parallel to the input direction of signals, but also in the second direction y which is substantially perpendicular to the input direction at the interval Q. In FIG. 28A, the diamond cutout holes C2 and triangle cutout holes C3 are aligned in the first direction at the interval P, and in the second direction y at the interval Q. In FIG. 28B, the hexagonal cutout holes C4 and triangle cutout holes C3 are aligned in the first direction at the interval P, and in the second direction y at the interval Q. The interval Q is for alignment within the wiring width of each of the wirings 11 (11a to 11c), which is smaller than the alignment interval of the electrodes. In this case also, the electrostatic coupling between the wiring 11 and the finger at the gap L generated between the electrodes 12 and 12 is made smaller, which can reduce unwanted tactile sense. Furthermore, since the substantially equal light transmittance may be attained across the entire area of the panel, favorable appearance may be achieved.

It is noted that the shapes of the cutout holes, the interval P in the first direction x and the interval Q in the second direction y may selectively be designed according to the electrostatic capacitance of the wirings 11 generated at the gap L between the electrodes as well as the in-plane distribution of the transmittance caused by the wirings. The shapes of the cutout holes are not limited to the examples described above, but may arbitrarily be selected from the combination of any polygons.

FIG. 29 illustrates an example where the cutout holes are configured in arbitrary shapes. In the present embodiment, the cutout holes in the same shape are not periodically aligned in the first direction x and the second direction y. The cutout holes and their alignment intervals are randomly configured. Since the cutout holes are formed based on the alignment interval of the electrodes as in the examples described above, "random" here in the present embodiment means that the interval is larger than the alignment interval of the electrodes.

For example, since adjacent wirings 11 such as the wirings 11a and 11b are electrically independent from each other, a gap U without any pattern is present between these wirings. A difference in transmittance occurs between the gap U and the regions of 11a to 11c depending on the presence or absence of any pattern. The periodic pattern in each wiring region is not visible as the difference in transmittance decreases, which allows the display to have more favorable appearance when used in combination with a display device. That is, the larger the proportion of the area of cutout holes to the area of the wiring pattern, the better the appearance will be. For example, (cutout hole area/pattern area) is preferably 1 or more, and more preferably 4 or more.

It is to be noted that the wirings 11 in the present embodiment may be formed by photolithography. In the example of FIG. 29, the wirings may further be formed using silver nanowire, carbon nanotube, graphene or the like.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A tactile presentation device, comprising:
    a substrate;
    a plurality of wirings extending on the substrate;
    a first insulating layer formed on the substrate and covering the plurality of wirings;
    a plurality of electrodes disposed on the first insulating layer;
    a second insulating layer covering the plurality of electrodes; and
    a drive circuit selectively applying a voltage signal to the plurality of electrodes through the wirings, based on a control signal input from an outside,
    wherein
    each one of the wirings is electrically connected to one of the electrodes via a through hole opened in the first insulating layer,
    at least one of the electrodes presents tactile sense to a user who touches the second insulating layer over the at least one of the electrodes in a state where the voltage signal is being applied,
    each of the wirings is partly covered with at least one of the electrodes,
    all of the plurality of wirings have a same length,
    an area, where each of the wirings overlaps the electrodes through the first insulating layer, is the same for all of the wirings, and
    in a direction from the electrodes to the substrate, each of the wirings passes under the electrodes such that the wirings are closer to the substrate than the electrodes are to the subrate.

2. The tactile presentation device according to claim 1, wherein
    the plurality of electrodes are arrayed in matrix, and
    the plurality of wirings extend in parallel to one alignment direction of the electrodes.

3. The tactile presentation device according to claim 2, wherein
    an interval between the plurality of electrodes that are adjacent to each other and are aligned in a same one of the wirings is smaller than a thickness of the second insulating layer.

4. The tactile presentation device according to claim 1, wherein
    cutout holes are formed in the plurality of wirings, and
    the cutout holes are formed at a constant interval in an extending direction of the wirings.

5. The tactile presentation device according to claim 4, wherein the cutout holes are formed at a constant interval in a direction substantially perpendicular to the extending direction of the wirings.

6. The tactile presentation device according to claim 4, wherein
the cutout holes are formed between the plurality of electrodes that are adjacent to each other.

7. The tactile presentation device according to claim 4, wherein
the cutout holes are contiguously formed across an entire area of the wirings.

8. The tactile presentation device according to claim 4, wherein
the cutout holes in each of the wirings are configured from a combination of a plurality of polygonal shapes.

9. The tactile presentation device according to claim 8, wherein
the plurality of polygonal shapes include a diamond shape and a triangular shape.

10. The tactile presentation device according to claim 1, wherein
each of the plurality of wirings has cutout holes with a plurality of arbitrary shapes in a wiring pattern, and
one or more of the plurality of cutout holes are aligned in an extending direction of the wirings or a direction substantially perpendicular to the extending direction.

11. The tactile presentation device according to claim 1, wherein
the plurality of electrodes are diamond-shaped electrodes arranged in a mesh pattern, and
the plurality of wirings extend in parallel to one diagonal line of the electrodes.

12. A tactile presentation device, comprising:
a plurality of electrodes aligned along a first direction above a substrate and held between a first insulating layer formed on the substrate and a second insulating layer formed over the first insulating, layer;
a plurality of wirings formed between the substrate and the first insulating layer, extending along the first direction under at least one of the electrodes, and arranged within a forming width of the electrodes in a second direction intersecting the first direction, each of the wirings being electrically connected to one of the plurality of electrodes via a through hole opened in the first insulating layer; and
a drive circuit connecting a part of the plurality of electrodes to a signal voltage source generating a voltage signal while connecting another part of the plurality of electrodes to a reference potential, based on a control signal input from an outside, wherein
all of the plurality of wirings have a same length,
an area, where each of the wirings overlaps the electrodes through the first insulating layer, is the same for all of the wirings, and
in a direction from the electrodes to the substrate, each of the wirings passes under the electrode such that the wirings are closer to the substrate than the electrodes are to the substrate.

13. Electronic equipment, comprising:
a touch panel display device that displays a result of processing performed by a processor included in the electronic equipment, and accepts an operation input corresponding to the result of processing; and
the tactile presentation device according to claim 1 that presents tactile sense in accordance with display of the result of processing.

14. Electronic equipment, comprising:
a touch panel display device that displays a result of processing performed by a processor included in the electronic equipment, and accepts an operation input corresponding to the result of processing; and
the tactile presentation device according to claim 12 that presents tactile sense in accordance with display of the result of processing.

* * * * *